US010438396B2

(12) United States Patent
Berghoff

(10) Patent No.: US 10,438,396 B2
(45) Date of Patent: *Oct. 8, 2019

(54) METHOD FOR EFFICIENT CONSTRUCTION OF HIGH RESOLUTION DISPLAY BUFFERS

(71) Applicants: Sony Interactive Entertainment LLC, San Mateo, CA (US); Sony Interactive Entertainment Europe Limited, London (GB)

(72) Inventor: Tobias Berghoff, Cambridge (GB)

(73) Assignees: SONY INTERACTIVE ENTERTAINMENT LLC, San Mateo, CA (US); SONY INTERACTIVE ENTERTAINMENT EUROPE LIMITED, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/835,341

(22) Filed: Dec. 7, 2017

(65) Prior Publication Data
US 2018/0101977 A1  Apr. 12, 2018

Related U.S. Application Data

(63) Continuation of application No. 14/246,064, filed on Apr. 5, 2014, now Pat. No. 9,865,074.

(51) Int. Cl.
*G06T 11/40* (2006.01)
*G06T 15/00* (2011.01)
(Continued)

(52) U.S. Cl.
CPC ............ *G06T 15/005* (2013.01); *G06T 11/40* (2013.01); *G06T 15/405* (2013.01); *G06T 15/80* (2013.01)

(58) Field of Classification Search
CPC ..... G06T 11/40; G06T 15/005; G06T 15/405; G06T 15/80
See application file for complete search history.

(56) References Cited

U.S. PATENT DOCUMENTS 4,513,317 A   4/1985  Ruoff
5,130,794 A   7/1992  Ritchey
(Continued)

FOREIGN PATENT DOCUMENTS

JP   2000155850 A   6/2000
JP   2002503854 A   2/2002
(Continued)

OTHER PUBLICATIONS

Non-Final Office Action for U.S. Appl. No. 14/1246,061, dated Oct. 20, 2016.
(Continued)

*Primary Examiner* — Sing-Wai Wu
(74) *Attorney, Agent, or Firm* — JDI Patent; Joshua Isenberg; Robert Pullman

(57) ABSTRACT

Graphics processing systems and methods are disclosed which may minimize invocations to a pixel shader in order to improve efficiency in a rendering pipeline. In implementations of the present disclosure, a plurality of samples within a pixel may be covered by a primitive. The plurality of samples may include one or more color samples and a plurality of depth samples. The nature of the samples which were covered by the primitive may be taken into account before invoking a pixel shader to perform shading computations on the pixel. In implementations of the present disclosure, if at least one sample is covered by a primitive, but none of the samples are color samples, an invocation to a pixel shader may be avoided.

18 Claims, 8 Drawing Sheets (Conventional: Aliased)

(51) Int. Cl.
 *G06T 15/40* (2011.01)
 *G06T 15/80* (2011.01)

(56) References Cited

U.S. PATENT DOCUMENTS

| | | |
|---|---|---|
| 5,224,208 A | 6/1993 | Miller et al. |
| 5,422,653 A | 6/1995 | Maguire |
| 5,602,391 A | 2/1997 | Pines et al. |
| 5,777,913 A | 7/1998 | Rasmusson |
| H1812 H | 11/1999 | Arcuri |
| 6,313,838 B1 | 11/2001 | Deering |
| 6,417,861 B1 | 7/2002 | Deering et al. |
| 6,424,343 B1 | 7/2002 | Deering et al. |
| 6,469,700 B1 | 10/2002 | Munshi et al. |
| 6,476,819 B1 | 11/2002 | Ozawa |
| 6,496,187 B1 | 12/2002 | Deering et al. |
| 6,731,298 B1 | 5/2004 | Moreton et al. |
| 6,804,066 B1 | 10/2004 | Ha et al. |
| 6,967,663 B1 | 11/2005 | Bastos et al. |
| 7,046,245 B2 | 5/2006 | Cerny et al. |
| 7,081,893 B2 | 7/2006 | Cerny |
| 7,161,603 B2 | 1/2007 | Saito et al. |
| 7,336,277 B1 | 2/2008 | Clark et al. |
| 7,339,594 B1 | 3/2008 | Newhall et al. |
| 7,355,604 B2 | 4/2008 | Bando et al. |
| 7,426,724 B2 | 9/2008 | Kilgard et al. |
| 7,511,717 B1 | 3/2009 | Bastos et al. |
| 7,786,993 B2 | 8/2010 | Cerny et al. |
| 7,876,332 B1 | 1/2011 | Donham et al. |
| 7,907,792 B2 | 3/2011 | Harville |
| 7,916,155 B1 | 3/2011 | Moreton |
| 8,031,192 B2 | 10/2011 | Cerny |
| 8,044,956 B1 | 10/2011 | Kilgard |
| 8,090,383 B1 | 1/2012 | Emigh et al. |
| 8,144,156 B1 | 3/2012 | Baldwin |
| 8,149,242 B2 | 4/2012 | Langyel et al. |
| 8,174,527 B2 | 5/2012 | Cerny et al. |
| 8,207,975 B1 | 6/2012 | Molnar et al. |
| 8,228,328 B1 | 7/2012 | French et al. |
| 8,233,004 B1 | 7/2012 | Molnar et al. |
| 8,300,059 B2 | 10/2012 | Isidoro et al. |
| 8,581,929 B1 | 11/2013 | Maguire |
| 8,643,644 B2 | 2/2014 | Wei et al. |
| 8,669,999 B2 | 3/2014 | Donovan et al. |
| 9,316,834 B2 | 4/2016 | Makino et al. |
| 9,495,790 B2 | 11/2016 | Cerny |
| 2002/0057279 A1 | 5/2002 | Jouppi |
| 2003/0086603 A1 | 5/2003 | Davidson et al. |
| 2003/0112238 A1 | 6/2003 | Cerny et al. |
| 2003/0112240 A1 | 6/2003 | Cerny |
| 2003/0122833 A1 | 7/2003 | Doyle |
| 2003/0234784 A1 | 12/2003 | Grzeszczuk et al. |
| 2004/0036692 A1 | 2/2004 | Alcorn et al. |
| 2004/0169663 A1 | 9/2004 | Bemier |
| 2004/0212619 A1 | 10/2004 | Saito et al. |
| 2004/0227703 A1 | 11/2004 | Lamvik et al. |
| 2005/0190183 A1 | 9/2005 | Barone et al. |
| 2005/0225670 A1 | 10/2005 | Wexler et al. |
| 2006/0001674 A1 | 1/2006 | Cerny et al. |
| 2006/0256112 A1 | 11/2006 | Heirich et al. |
| 2006/0277520 A1 | 12/2006 | Gennari |
| 2007/0002049 A1 | 1/2007 | Cerny |
| 2007/0018988 A1 | 1/2007 | Guthe |
| 2007/0165035 A1 | 7/2007 | Duluk et al. |
| 2007/0183649 A1 | 8/2007 | Kiefer et al. |
| 2008/0062164 A1 | 3/2008 | Bassi et al. |
| 2008/0106489 A1 | 5/2008 | Brown et al. |
| 2008/0113792 A1 | 5/2008 | Yamada et al. |
| 2008/0129748 A1 | 6/2008 | Bakalash et al. |
| 2009/0002380 A1 | 1/2009 | Langyel et al. |
| 2009/0033659 A1 | 2/2009 | Lake et al. |
| 2009/0141033 A1 | 6/2009 | Street |
| 2010/0002000 A1 | 1/2010 | Everitt et al. |
| 2010/0007662 A1 | 1/2010 | Cox et al. |
| 2010/0104162 A1 | 4/2010 | Falk et al. |
| 2010/0156919 A1 | 6/2010 | Bala et al. |
| 2010/0214294 A1 | 8/2010 | Li et al. |
| 2010/0283783 A1 | 11/2010 | Cerny et al. |
| 2011/0090242 A1 | 4/2011 | Frederiksen |
| 2011/0090250 A1 | 4/2011 | Molnar et al. |
| 2011/0134136 A1 | 6/2011 | Seiler |
| 2011/0188744 A1 | 8/2011 | Sun |
| 2011/0216069 A1 | 9/2011 | Keall et al. |
| 2012/0014576 A1 | 1/2012 | Olson et al. |
| 2012/0069021 A1 | 3/2012 | Son et al. |
| 2012/0092366 A1 | 4/2012 | Smithers et al. |
| 2012/0206452 A1 | 8/2012 | Geisner et al. |
| 2012/0293486 A1 | 11/2012 | Adachi |
| 2012/0293519 A1 | 11/2012 | Ribble et al. |
| 2013/0021358 A1 | 1/2013 | Nordlund et al. |
| 2013/0063440 A1 | 3/2013 | Son et al. |
| 2013/0093766 A1 | 4/2013 | Hutchins et al. |
| 2013/0114680 A1 | 5/2013 | Leontaris et al. |
| 2013/0120380 A1 | 5/2013 | Kallio et al. |
| 2013/0141445 A1 | 6/2013 | Engh-Halstvedt et al. |
| 2013/0265309 A1 | 10/2013 | Goel et al. |
| 2013/0300740 A1 | 11/2013 | Snyder et al. |
| 2013/0342547 A1 | 12/2013 | Lum et al. |
| 2014/0049549 A1 | 2/2014 | Lukyanov et al. |
| 2014/0063016 A1 | 3/2014 | Howson et al. |
| 2014/0362081 A1 | 12/2014 | Cerny et al. |
| 2014/0362100 A1 | 12/2014 | Cerny et al. |
| 2014/0362101 A1 | 12/2014 | Cerny et al. |
| 2014/0362102 A1 | 12/2014 | Cerny et al. |
| 2015/0089367 A1 | 3/2015 | Dodge et al. |
| 2015/0287158 A1 | 10/2015 | Cerny et al. |
| 2015/0287166 A1 | 10/2015 | Cerny |
| 2015/0287167 A1 | 10/2015 | Cerny |
| 2015/0287230 A1 | 10/2015 | Cerny |
| 2015/0287232 A1 | 10/2015 | Cerny |
| 2016/0246323 A1 | 8/2016 | Cerny et al. |
| 2017/0031732 A1 | 2/2017 | Cerny et al. |
| 2017/0031834 A1 | 2/2017 | Cerny et al. |
| 2017/0061671 A1 | 3/2017 | Cerny |
| 2017/0123961 A1 | 5/2017 | Cerny et al. |

FOREIGN PATENT DOCUMENTS

| | | |
|---|---|---|
| JP | 2002503855 A | 7/2002 |
| JP | 2002260003 A | 9/2002 |
| JP | 2002537614 A | 11/2002 |
| JP | 2004265413 A | 9/2004 |
| JP | 2006293627 A | 10/2006 |
| JP | 2008233765 A | 10/2008 |
| JP | 2009116550 A | 5/2009 |
| JP | 2013137756 A | 7/2013 |
| KR | 20130029149 A | 3/2013 |
| TW | 1250785 B | 3/2006 |
| TW | 200919376 A | 5/2009 |
| TW | 201001329 A | 1/2010 |
| TW | 201143466 A | 12/2011 |
| WO | 2010111258 A1 | 9/2010 |
| WO | 2013076994 A1 | 5/2013 |
| WO | 2013076994 A9 | 4/2014 |

OTHER PUBLICATIONS

Non-Final Office Action for U.S. Appl. No. 15/351,310, dated Feb. 6, 2017.
Non-Final Office Action for U.S. Appl. No. 14/246,061, dated Aug. 24, 2017.
Notice of Allowance dated Aug. 4, 2017 for U.S. Appl. No. 14/246,066.
Notice of Allowance for U.S. Appl. No. 14/246,066, dated Aug. 4, 2017.
Notice of Allowance for U.S. Appl. No. 15/351,310, dated Jun. 5, 2017.
Notice of Allowance for U.S. Appl. No. 14/246,062, dated Jan. 4, 2017.
Notice of Allowance for U.S. Appl. No. 14/246,063, dated Mar. 14, 2017.
Notice of Allowance for U.S. Appl. No. 14/246,067, dated Mar. 16, 2017.

(56) References Cited

OTHER PUBLICATIONS

Notice of Allowance for U.S. Appl. No. 14/246,068, dated Jul. 15, 2016.
Notification of Reason(s) for Refusal dated Feb. 6, 2018 for Japanese Patent application No. 2016-560652.
Notice of Reason(s) for Refusal dated Sep. 12, 2017 for Japanese Patent application No. 2016-559961.
Notification of Reasons for Refusal dated Feb. 6, 2018 for Japanese Patent application No. 2016-560826.
Office Action dated Aug. 1, 2017 for Korean Patent Application No. 0-2016-7027635.
Office Action dated Aug. 29, 2017 for TW Application No. 105138883.
Office Action dated Jan. 9, 2018 for Taiwan Patent Application No. 104108773.
Office Action dated Oct. 3, 2017 for JP Application No. 2016-560398.
Office Action dated Oct. 31, 2017 for Japan Patent Application 2016-560646.
Office Action dated Oct. 31, 2017 for Japan Patent Application No. 2016-560646.
Office Action dated Sep. 5, 2017 for Japanese Patent Application No. 2016-560642.
Scott Kircher et al: "Inferred lighting: fast dynamic lighting and shadows for opaque and translucent objects", Sandbox 2009: Proceedings ; 4th ACM SIGGRAPH Symposium on Video Games ; New Orleans , Louisiana , Aug. 4-6, 2009 , ACM, New York, NYRetrieved from the Internet: URL:http://dl.acm.org/ft_gateway.cfm?id=15810808&ftid=658593&dwn=I&CFID=587315678&CFTOKEN=20408680.
Shirman et al, "A new look at mipmap level estimation techniques" , Computers and Graphics , Elsevier, GB , vol. 23 , No. 2, Apr. 1, 1999 (Apr. 1999) , pp. 223-231 , XP004165786 , ISSN: 0097-8493.
Steve Marschner et al: "Geometry-Aware Framebuffer, Level of Detail", Eurographics Symposium on Rendering 2008, Jan. 1, 2008 (Jan. 1, 2008), XP055239091, Retrieved from the Internet: URL:https://www.cs.virginia.edu/~jdl/papers/resize/yang_egsr08.pdf.
Taiwan Office Action for TW Application No. 104108777, dated Jun. 27, 2016.
Taiwanese Office Action for TW Application No. 104108773, dated Dec. 22, 2015.
Taiwanese Office Action for TW Application No. 104108774, dated Sep. 12, 2016.
U.S. Appl. No. 14/246,061, to Tobias Berghoff, filed Apr. 5, 2014.
U.S. Appl. No. 14/246,062, to Mark Evan Cerny, filed Apr. 5, 2014.
U.S. Appl. No. 14/246,063, to Mark Evan Cerny, filed Apr. 5, 2014.
U.S. Appl. No. 14/246,064, to Tobias Berghoff, filed Apr. 5, 2014.
U.S. Appl. No. 14/246,067, to Tobias Berghoff, filed Apr. 5, 2014.
U.S. Appl. No. 14/246,068, to Mark Evan Cerny, filed Apr. 5, 2014.
U.S. Appl. No. 61/975,774, to Mark Evan Cerny, filed Apr. 5, 2014.
About Early-Z Culling (Advance Z Pick), Author: cywater2000, Date: Dec. 7, 2008, From.
Co-Pending U.S. Appl. No. 14/246,061, to Tobias Berghoff, filed Apr. 5, 2014.
Co-Pending U.S. Appl. No. 14/246,062, to Mark Evan Cerny, filed Apr. 5, 2014.
Co-pending U.S. Appl. No. 14/246,063, to Mark Evan Cerny, filed Apr. 5, 2014.
Co-pending U.S. Appl. No. 14/246,064, to Tobias Berghoff, filed Apr. 5, 2014.
Co-pending U.S. Appl. No. 14/246,066, to Mark Even Cerny, filed Apr. 5, 2014.
Co-pending U.S. Appl. No. 14/246,067, to Tobias Berghoff, filed Apr. 5, 2014.
Co-pending U.S. Appl. No. 14/246,068, to Mark Evan Cerny, filed Apr. 5, 2014.
Extended European search report dated Aug. 29, 2017 for European Patent Application No. 15773477.3.
Extended European search report dated Sep. 22, 2017 for European Patent Application No. 15772568.0.
Extended European Search Report dated Aug. 29, 2017 for EP Application No. 15773477.3.
Extended European Search Report dated Oct. 2, 2017 for European patent application EP15773048.
Extended European Search Report dated Sep. 22, 2017 for EP Application No. 15772990.
Final Office Action for U.S. Appl. No. 14/246,061, dated Feb. 20, 2018.
Final Office Action for U.S. Appl. No. 14/246,061, dated Apr. 7, 2017.
Final Office Action for U.S. Appl. No. 14/246,061, dated Jun. 17, 2016.
Final Office Action for U.S. Appl. No. 14/246,062, dated Jul. 15, 2016.
Final Office Action for U.S. Appl. No. 14/246,063, dated Jun. 21, 2016.
Final Office Action for U.S. Appl. No. 14/246,064, dated Jul. 11, 2016.
Final Office Action for U.S. Appl. No. 14/246,064, dated May 5, 2017.
Final Office Action for U.S. Appl. No. 141246,066, dated Apr. 7, 2017.
Final Office Action for U.S. Appl. No. 141246,066, dated Jul. 20, 2016.
Final Office Action for U.S. Appl. No. 14/246,067, dated Jun. 17, 2016.
International Search Report and Written Opinion for International Application No. PCT/US2015/024303, dated Jul. 1, 2015.
International Search Report and Written Opinion for International Application No. PCT/US2015/21951, dated Jul. 1, 2015.
International Search Report and Written Opinion for International Application No. PCT/US2015/21956, dated Jul. 1, 2015.
International Search Report and Written Opinion for International Application No. PCT/US2015/21971, dated Jul. 1, 2015.
International Search Report and Written Opinion for International Application No. PCT/US2015/21978, dated Jul. 1, 2015.
International Search Report and Written Opinion for International Application No. PCT/US2015/21984, dated Jul. 1, 2015.
International Search Report and Written Opinion for International Application No. PCT/US2015/21987, dated Jul. 1, 2015.
International Search Report and Written Opinion for International Application No. PCT/US201521982, dated Jul. 1, 2015.
John D. Owens, Mike Houston, David Luebke, Simon Green, John E. Stone, and James C. Phillips, "GPU Computing", Proceeding of IEEE, May 2008, p. 879-899.
Kayvon Fatahalian et al: "Reducing shading on GPUs using quad-fragment merging" , ACM Transactions on Graphics US, vol. 29 , No. 4, Jul. 26, 2010 pp. 1-8 , XP058157954, ISSN: 0730-0301.
Marries Van De Hoef et al: "Comparison of mutiple rendering techniques", Jun. 4, 2010 (Jun. 9, 2010).
Matthaus G. Chajdas, Morgan McGuire, David Luebke; "Subpixel Reconstruction Antialiasing for Deferred Shading" in 3D, Feb. 2011.
Non-final Office Action dated Aug. 24, 2017 for U.S. Appl. No. 14/246,061.
Non-Final Office Action for U.S. Appl. No. 15/587,825, dated Jun. 30, 2017.
Non-Final Office Action for U.S. Appl. No. 15/717,041, dated Dec. 14, 2017.
Non-Final Office Action for U.S. Appl. No. 14/246,061, dated Jan. 4, 2016.
Non-Final Office Action for U.S. Appl. No. 14/246,062, dated Jan. 14, 2016.
Non-Final Office Action for U.S. Appl. No. 14/246,063, dated Jan. 4, 2016.
Non-Final Office Action for U.S. Appl. No. 14/246,063, dated Nov. 23, 2016.
Non-Final Office Action for U.S. Appl. No. 14/246,064, dated Dec. 8, 2016.
Non-Final Office Action for U.S. Appl. No. 14/246,064, dated Feb. 1, 2015.
Non-Final Office Action for U.S. Appl. No. 14/246,066, dated Dec. 30, 2016.

(56) References Cited

OTHER PUBLICATIONS

Non-Final Office Action for U.S. Appl. No. 14/246,066, dated Feb. 5, 2016.
Non-Final Office Action for U.S. Appl. No. 14/246,067, dated Jan. 22, 2016.
Non-Final Office Action for U.S. Appl. No. 14/246,067, dated Oct. 27, 2016.
Non-Final Office Action for U.S. Appl. No. 14/246,068, dated Jan. 14, 2016.
Non-Final Office Action for U.S. Appl. No. 14/678,445, dated Dec. 30, 2016.
Extended European Search Report dated Sep. 22, 2017 for European patent application EP15772990.6.
Final Office Action for U.S. Appl. No. 15/587,285, dated Feb. 6, 2018.
Final Office Action for U.S. Appl. No. 15/717,041, dated Apr. 18, 2018.
Notice of Allowance for U.S. Appl. No. 15/587,825, dated May 31, 2018.
Office Action dated Apr. 26, 2018 for Korean Patent Application No. 10-2016-7027105.
Office Action dated Apr. 26, 2018 for Korean Patent Application No. 10-2016-7027106.
Office Action dated May 28, 2018 for Korean Patent Application No. 2016-7027633.
EPC Rule 94(3) Communication dated Sep. 12, 2018 for European Patent Application No. 15772605.0.
Final Office Action dated Sep. 4, 2018 for Japanese Patent application No. 2016-560642.
Final Office Action for U.S. Appl. No. 15/653,422, dated Jan. 28, 2019.
Non-Final Action for U.S. Appl. No. 15/652,134, dated Aug. 24, 2018.
Non-Final Office Action for U.S. Appl. No. 15/829,579, dated Oct. 18, 2018.
Notice of Allowance dated Jul. 17, 2018 for U.S. Appl. No. 15/717,041.
Notice of Allowance dated May 31, 2018 for U.S. Appl. No. 15/587,825.
Notification of Reasons for Refusal dated Jan. 15, 2019 for Japanese Patent Application No. 2018-024157.
Office Action dated Jul. 26, 2018 for Korean patent application No. 10-2016-7031094.
Non-Final Office Action for U.S. Appl. No. 16/119,274, dated Mar. 21, 2019.
Non-Final Office Action for U.S. Appl. No. 15/653,422, dated Apr. 16, 2019.
Notice of Allowance for U.S. Appl. No. 15/652,134, dated May 7, 2019.
Notice of Allowance for U.S. Appl. No. 15/829,579, dated May 21, 2019.
Notice of Allowance for U.S. Appl. No. 15/653,422, dated Jul. 31, 2019.
Office Action dated Jul. 9, 2019 for Japanese Patent Application No. 2018-082884.

FIG. 1A (Conventional: Aliased)

FIG. 2A (Conventional: Anti-Aliased)

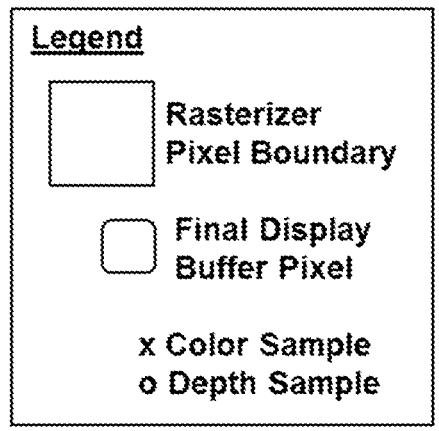
FIG. 7A
FIG. 7B
FIG. 7C
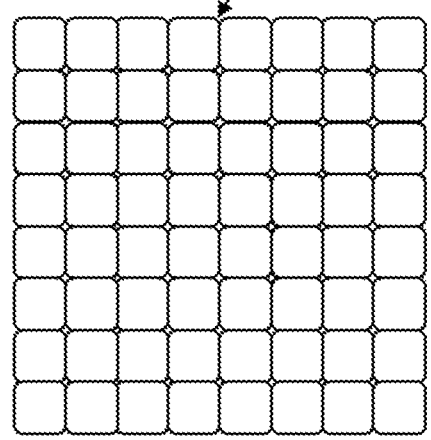
FIG. 7D

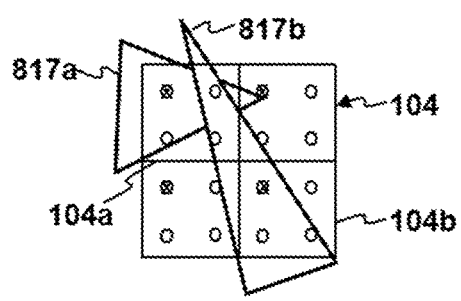
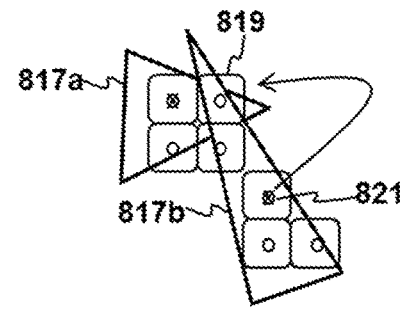
FIG. 8A FIG. 8B
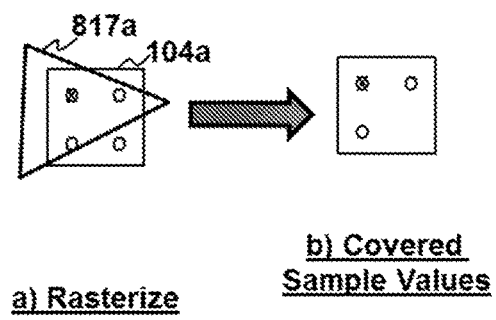
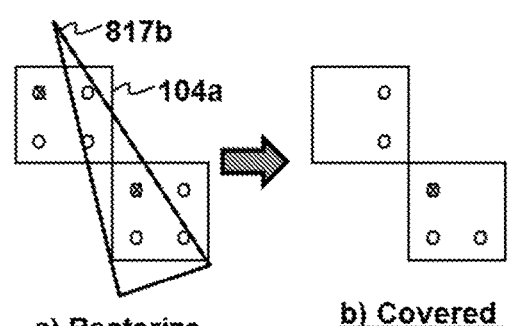
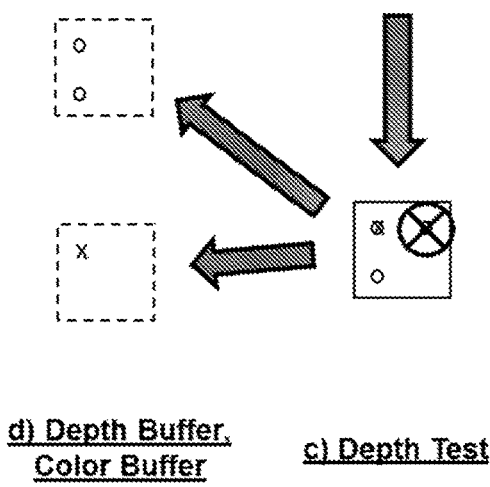
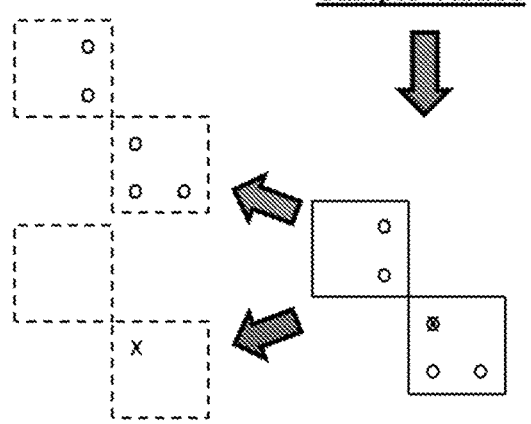
FIG. 8C FIG. 8D

METHOD FOR EFFICIENT CONSTRUCTION OF HIGH RESOLUTION DISPLAY BUFFERS

CLAIM OF PRIORITY

This application is a continuation of U.S. patent application Ser. No. 14/246,064, filed Apr. 5, 2014, the entire contents of which are incorporated herein by reference.

CROSS-REFERENCE TO RELATED APPLICATIONS

This application is related to commonly-assigned, U.S. patent application Ser. No. 14/246,067 (now U.S. Pat. No. 9,710,957, to Tobias Berghoff, entitled "GRAPHICS PROCESSING ENHANCEMENT BY TRACKING OBJECT AND/OR PRIMITIVE IDENTIFIERS", filed Apr. 5, 2014, the entire contents of which are herein incorporated by reference.

This application is related to commonly-assigned, U.S. patent application Ser. No. 14/246,067 (now U.S. Pat. No. 9,495,790, to Mark Evan Cerny, entitled "GRADIENT ADJUSTMENT FOR TEXTURE MAPPING TO NON-ORTHONORMAL GRID", filed Apr. 5, 2014, the entire contents of which are herein incorporated by reference.

This application is related to commonly-assigned, U.S. patent application Ser. No. 14/246,061 (published as U.S. Patent Application Publication Number 2015/0287165), to Tobias Berghoff, entitled "VARYING EFFECTIVE RESOLUTION BY SCREEN LOCATION BY CHANGING ACTIVE COLOR SAMPLE COUNT WITHIN MULTIPLE RENDER TARGETS", filed Apr. 5, 2014, the entire contents of which are herein incorporated by reference.

This application is related to commonly-assigned, U.S. patent application Ser. No. 14/246,063 (now U.S. Pat. No. 9,710,881), to Mark Evan Cerny, entitled "VARYING EFFECTIVE RESOLUTION BY SCREEN LOCATION BY ALTERING RASTERIZATION PARAMETERS", filed Apr. 5, 2014, the entire contents of which are herein incorporated by reference.

This application is related to commonly-assigned, U.S. patent application Ser. No. 14/246,066 (now U.S. Pat. No. 9,836,816) to Mark Evan Cerny, entitled "VARYING EFFECTIVE RESOLUTION BY SCREEN LOCATION IN GRAPHICS PROCESSING BY APPROXIMATING PROJECTION OF VERTICES ONTO CURVED VIEWPORT", filed Apr. 5, 2014, the entire contents of which are herein incorporated by reference.

This application is related to commonly-assigned, U.S. patent application Ser. No. 14/246,062 (now U.S. Pat. No. 9,652,882), to Mark Evan Cerny, entitled "GRADIENT ADJUSTMENT FOR TEXTURE MAPPING FOR MULTIPLE RENDER TARGETS WITH RESOLUTION THAT VARIES BY SCREEN LOCATION", filed Apr. 5, 2014, the entire contents of which are herein incorporated by reference.

FIELD

The present disclosure relates to computer graphics processing, and, in particular, graphics rendering pipelines which utilize pixel shaders and multiple samples within a pixel.

BACKGROUND

Computer graphics processing is an intricate process used to create images that depict virtual content for presentation on a display. Modern 3D graphics are often processed using highly capable graphics processing units (GPU) having specialized architectures designed to be efficient at manipulating computer graphics. The GPU is a specialized electronic circuit designed to accelerate the creation of images in a frame buffer intended for output to a display, and GPUs often have a highly parallel processing architecture that makes the GPU more effective than a general-purpose CPU for algorithms where processing of large blocks of data is done in parallel. GPUs are used in a variety of computing systems, such as embedded systems, mobile phones, personal computers, tablet computers, portable game devices, workstations, and game consoles.

Many modern computer graphics processes for video games and other real-time applications utilize a rendering pipeline that includes many different stages to perform operations on input data that determine the final array of pixel values that will be presented on the display. In some implementations of a graphics rendering pipeline, processing may be coordinated between a CPU and a GPU. Input data may be setup and drawing commands may be issued by the central processing unit (CPU) based on the current state of an application (e.g., a video game run by the CPU) through a series of draw calls issued to the GPU through an application programming interface (API), which may occur many times per graphics frame, and the GPU may implement various stages of the pipeline in response in order to render the images accordingly.

Most stages of the pipeline have well defined inputs and outputs as data flows through the various processing stages, and any particular implementation may include or omit various stages depending on the desired visual effects. Sometimes various fixed function operations within the graphics pipeline are implemented as hardware modules within the GPU, while programmable shaders typically perform the majority of shading computations that determine color, lighting, texture coordinates, and other visual values associated with the objects and pixels in the image, although it is possible to implement various stages of the pipeline in hardware, software, or a combination thereof. Older GPUs used a predominantly fixed function pipeline with computations fixed into individual hardware modules of the GPUs, but the emergence of shaders and an increasingly programmable pipeline have caused more operations to be implemented by software programs, providing developers with more flexibility and greater control over the rendering process.

Generally speaking, early stages in the pipeline include computations that are performed on geometry in virtual space (sometimes referred to herein as "scene space"), which may be a representation of a two-dimensional or, far more commonly, a three-dimensional virtual world. The objects in the virtual space are typically represented as a polygon mesh set up as input to the early stages of the pipeline, and whose vertices correspond to the set of primitives in the image, which are typically triangles but may also include points, lines, and other polygonal shapes. The vertices of each primitive may be defined by a set of parameter values, including position values (e.g., X-Y coordinate and Z-depth values), color values, lighting values, texture coordinates, and the like, and the graphics may be processed in the early stages through manipulation of the parameter values of the vertices on a per-vertex basis. Operations in the early stages may include vertex shading computations to manipulate the parameters of the vertices in virtual space, as well as optionally tessellation to subdivide scene geometries and geometry shading computations to generate new scene geometries beyond those initially set up in the application stage. Some of these operations may be performed by programmable shaders, including vertex shaders which manipulate the parameter values of the vertices of the primitive on a per-vertex basis in order to perform rendering computations in the underlying virtual space geometry.

To generate images of the virtual world suitable for a display, the objects in the scene and their corresponding primitives are converted from virtual space to screen space. Intermediate stages may include various operations to determine the mapping of primitives to a two dimensional plane defining the screen space. Rasterization processes are used to sample the processed primitives from the early stages at discrete pixels in screen space defined for the rasterizer, as well as generate fragments for primitives that are covered by samples of the rasterizer. These intermediate operations associated with the rasterization of the scene to screen space may also include operations such as clipping primitives outside the viewing frustum of the current view and culling back-faced primitives hidden from the current view as an optimization to avoiding processing fragments that would result in unnecessary per-pixel computations for primitives that are occluded or otherwise invisible in the final image. The parameter values used as input values for each fragment are typically determined by interpolating the parameters of the vertices of the sampled primitive that created the fragment to a location of the fragment's corresponding pixel, which is typically the center of the pixel or a different sample location within the pixel, although other interpolation locations may be used in certain situations.

The pipeline may then pass the fragments and their interpolated input parameter values down the pipeline for further processing. During these later stages, per-fragment operations may be performed by invoking a pixel shader (sometimes known as a "fragment shader") to further manipulating the input interpolated parameter values, e.g., color values, depth values, lighting, texture coordinates, and the like for each of the fragments, on a per-pixel or per-sample basis. Each fragment's coordinates in screen space correspond to the pixel coordinates and/or sample coordinates defined in the rasterization that generated them.

In the simplest case, a single sample is used per pixel corresponding to the pixel center, and a single fragment is processed for the primitive covering the pixel center. If that fragment passes a depth test, e.g., it is not occluded by another primitive at the same screen space location, then the output color values of the fragment computed by the pixel shader are written to a color buffer for those pixel coordinates, and possibly output depth values are written to a depth buffer if the pixel shader is programmed to export the depth value.

Sometimes, multiple sub-pixel samples are used for anti-aliasing, which may reduce the appearance of high frequency artifacts in sampled textures, as well as smooth jagged edges at primitive boundaries by allowing a given pixel in the color buffer to adopt a blend of output color values from different fragments computed from different primitives covering the different sub-pixel samples. Where multiple samples are used, each fragment's output may be applied to one or more sub-pixel samples covered by the primitive that generated it.

If conventional supersampling is used, a unique fragment is processed by the pixel shader for each sub-pixel sample, and its output is written to a color buffer at the sample coordinates, essentially treating the sample like a mini-pixel and rendering to a higher resolution. The higher resolution color buffer may then be down sampled to filter it down to the display resolution in the display buffer. Since a unique fragment needs to be processed by the pixel shader for each covered sample, the process is computationally demanding and significant shader overhead is introduced.

Conventional multisampling mitigates the drawbacks of supersampling somewhat by processing a single fragment with a pixel shader and applying its values to multiple covered samples in the color buffer. The simplest multisampling utilizes each sample for both color and depth, calculates and writes depth per sample as in super-sampling, and replicates a single output color per pixel to all covered samples in each pixel. New multisampling techniques, such as coverage sampling anti-aliasing (CSAA) and enhanced quality anti-aliasing (EQAA), have arisen recently which decouple some of the color samples from the depth samples in order to more accurately sample coverage of primitive edges within a rasterizer pixel's boundaries without the additional overhead that would be incurred by adding additional depth samples. With these multisampling techniques, there are typically more color samples than depth samples in the pixel (i.e., some samples are used only for color), and a fragment is processed by the pixel shader for a primitive anytime at least one sample in a pixel is covered, and the fragment's output color values may be applied to each covered sample in the color buffer.

Some new multi-sampling techniques also allow color samples to be decoupled from depth samples, such that more accurate depth information can be generated without increasing the size of color buffer data. However, these techniques consider even those samples which have only depth information to be shaded samples, and so invoke the pixel shader for any fragment in which any sample is covered even when no color samples are covered and the output color will be discarded. Unfortunately, pixel shader calculations are computationally expensive and introduce wasted computational overhead anytime the fragment's output values do not contribute to the final display pixel values in the rendered image. In video games and other instances of real-time graphics processing, reducing computational requirements and improving computational efficiency for rendering tasks is a critical objective for achieving improved quality and detail in rendered graphics. Moreover, with the recent advent of ultra-high definition ("ultra HD" or "4 k") displays having horizontal resolutions on the order of 4000 pixels, there is a need for more efficient graphics processing methods that can keep up with advances in display technologies.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which:

FIGS. 1A-1B are schematic diagrams depicting a graphics rendering process according to a first conventional, aliased approach.

FIGS. 2A-2B are schematic diagrams depicting a graphics rendering process according to a second conventional, anti-aliased approach.

FIGS. 7A-7D are schematic diagrams of rasterization processes and display buffers according to aspects of the present disclosure.

FIGS. 8A-8D are schematic diagrams of graphics processing according to aspects of the present disclosure.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Aspects of the present disclosure describe graphics processing systems and methods which may minimize invocations to a pixel shader in order to improve efficiency in a rendering pipeline. In implementations of the present disclosure, a plurality of samples may be taken in the primitive. The samples may include both depth and color samples, with the depth sample count greater than the color sample count in each pixel. When at least one of the samples is covered, the nature of the samples which were covered by the primitive may be taken into account before invoking a pixel shader to perform shading computations. If at least one sample is covered by a primitive, but none of the samples are color samples, an invocation to a pixel shader may be avoided in certain situations.

In conventional rendering pipelines, a pixel shader would be invoked regardless of the type of sample covered by the primitive. Thus, fragment shading computations would be performed, and the color values computed by the pixel shader for the fragment would be applied to only those color samples covered by the primitive that generated the fragment. If a sampling scheme were to be used during conventional rasterization that had some samples used only for color, the pixel shader would be invoked even if the samples covered by the primitive were only depth samples, and the computed color values would be discarded since there would be no color samples in the pixel to apply them to.

Figure 1B:
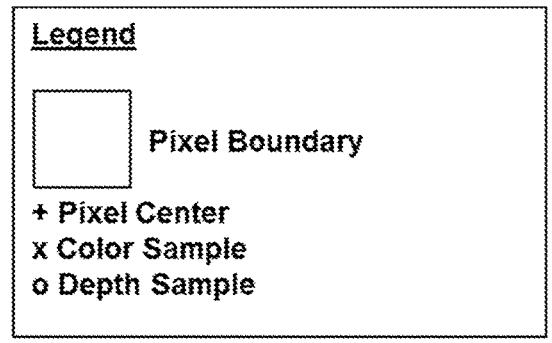

To better appreciate certain aspects of the present disclosure, a first conventional approach to graphics processing is depicted in FIGS. 1A-1B. The example illustrated in FIGS. 1A-1B utilizes only a single sample location per pixel, which may result in pronounced aliasing artifacts in the final set of pixels.

FIG. 1A depicts a plurality of triangles 102a,b which may each be primitives forming part of the geometry in an image to be rendered, and a set of screen space pixels 104 (or screen space pixel boundaries) overlaid over the primitives. In FIG. 1A, each screen space pixel is only sampled at a single location, which is the center of the pixel 104 in the illustrated example. This sample may be used to determine each parameter of the screen pixel, including color, depth, or another parameter. When the sample in a pixel is covered by a primitive, i.e., when the center of the screen space pixel is covered in this example, a fragment may be generated for the primitive covering the sample, and the fragment may be further processed before the final value of that screen space pixel is determined.

FIG. 1B illustrates the fragments 106a and 106b generated from sampling the primitives 102a and 102b, respectively. That is, FIG. 1B illustrates the pixels for which at least one fragment is generated for underlying primitive. As shown in FIG. 1B, fragments 106a are generated from primitive 102a because the samples at the center of those corresponding pixels were covered by that triangle, and likewise for fragments 106b and primitive 102b. The parameter values of the fragments 106a,b may be determined by interpolating the parameters of the vertices of the respective primitive 102a,b that generated the fragment to the location of the fragment. For example, the parameter values of each vertex of the triangle 102a may be interpolated to the center of each fragment 106a in order to determine a set of parameter values for each of these fragments 106a, and a similar process may be performed for each of fragments 106b using the vertex parameter values of the triangle 102b. The parameters may include texture coordinates, normals, tangents, lighting values, color values, positions (including depth values), and the like.

Each of the fragments 106a,b and their interpolated parameter values may be further processed before determining the final pixel values of those corresponding pixels in the final rendered image. Some of these computations include pixel shading computations performed by invoking a pixel shader in order to perform additional per-fragment manipulations of colors, textures, or other fragment parameter values before determining the pixel's color values in the frame.

It can be appreciated from the illustration of FIG. 1B that the sampling scheme of this first conventional approach may result in certain aliasing artifacts at the borders of the primitives 102a,b. As can be seen in the illustrated example, some pixels may be located at the border of primitives, and the defined boundaries of these border pixels may actually be covered by multiple primitives when these primitives are mapped (e.g., projected/transformed) to the screen space coordinates of that pixel. However, since each pixel is only sampled in a single location, a fragment will be generated for one primitive or the other, but not both. That is, coverage is determined based solely on the single sample location. This may create a jagged effect (sometimes referred to as "jaggies") in the colors and other parameters in the final image, which can be understood with reference to the staircased appearance of the fragments 106a and 106b at the diagonally oriented border between triangles 102a and 102b. Stated another way, for each of the border pixels whose boundaries cross the border of the primitives 102a and 102b, in the conventional aliased example of FIGS. 1A-1B the final value of the border pixel in the frame buffer will be determined by fragments generated for primitive 102a, or 102b, but not both, based on which primitive covers the sample, and this may result in aliasing artifacts presented in the final image.

To overcome drawbacks associated with the aliased approached described above with reference to FIGS. 1A-1B, multiple samples per-pixel are sometimes used to anti-alias the image. When a pixel's boundaries are at the border of a primitive, the different sub-pixels samples may be covered by different primitives, and the final values of the display pixel are conventionally a combination of the values from the different primitives determined by combining the different sub-pixel sample values weighted by sample covered to determine a single pixel's color value in the final display buffer.

Figure 2B:
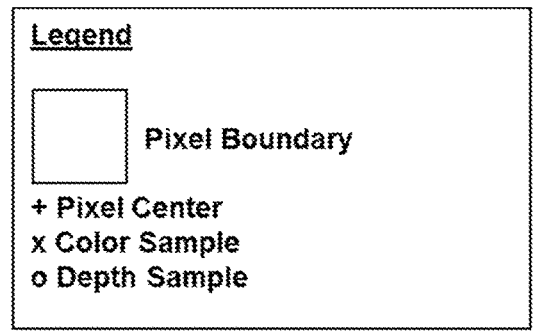

An example of a conventional anti-aliasing scheme is depicted in FIGS. 2A-2B, and the conventional example of FIGS. 2A-2B uses the same pixels 104 and primitives 102a,b as the conventional aliased example of FIGS. 1A-1B. As shown in FIG. 2A, rather than simply taking a single sample at each the center of each pixel 104, as in the example of FIG. 1A, multiple samples are taken across the area of each pixel. In the illustrated example, samples are taken at four different locations within the boundaries of each screen pixel 104 defined for the rasterizer, and typically at least one fragment is generated from a given primitive at the screen pixel 104 if at least one of its samples is covered by the given primitive. That is, when the area of the primitive as projected onto screen space covers a sample of the pixel defined in screen space, at least one fragment may be generated for further processing.

FIG. 2B depicts the fragments 206a and 206b generated from the sampling of the primitives 102a and 102b, respectively. That is, the illustrated fragments 206a are those screen pixel boundaries where at least one fragment is processed for the underlying primitive 102a, and the illustrated fragments 206b are those screen pixel boundaries where at least one fragment is processed for the underlying primitive 102b. As in the first example, a fragment is generated for the primitive when at least one pixel sample is covered by the primitive, and each fragment will have parameter values interpolated to the location of the fragment from the parameter values of the vertices of the primitive that generated it. Also similar to the first example, a pixel shader will be invoked for each of the fragments for further per-fragment pixel shading computations that may manipulate the parameters of the fragments to affect the final color value output for the fragment.

If traditional supersampling were used, multiple color fragments would be generated for each covered sample, and the individual color fragments would be uniquely shaded and applied to their corresponding sample. In this case, the output color values of each fragment would be written to the corresponding sample in screen space at what is a essentially a higher resolution color buffer, then down filtered to determine the final pixel values in the particular screen space pixel 104. Since each sample is essentially treated like a mini-pixel in supersampling, the pixel shader may use parameter values interpolated to the corresponding sample location as input for each fragment. While this achieves good results, this introduces a large amount of shader overhead, since the pixel shader is invoked once for each individual sample.

If traditional multisampling were used, a single color fragment at the pixel coordinates would be generated for the given primitive anytime at least one sample is covered by the primitive, regardless of the number of samples falling within the primitive, and the same output values of the pixel shader would then be applied to the each covered sample, e.g., if three samples are covered, one fragment may be processed and its output values may be replicated for each of the covered samples. The vertex parameter values may be interpolated to the center of the screen space pixel as input for the fragment for all of the samples (although it is noted that if the pixel center falls outside the primitive border, the interpolated value may be an extrapolation, or centroid sampling may be used to use a values interpolated to within the boundaries of the primitive). Since a pixel shader only needs to be invoked once per-pixel for each covered primitive, multisampling may reduce shader overhead significantly in situations where multiple samples are covered.

Some hybrid of the two (multisampling/supersampling hybrid) could be used to provide a configurable pixel shader iteration within a pixel, where the pixel shader is invoked multiple times for a screen pixel (e.g., multiple color fragments would be processed by the pixel shader), then each color fragment output is further applied to more than one sample. For example, 8 color samples could be taken, with 4 of these being "shaded" color samples and 4 being "stored" color samples. The pixel shader could be invoked once for each of the 4 "shaded" color samples using, resulting in a unique shaded color value for each of the shaded color samples. Then each shaded color fragment output could be applied to the shaded color sample and one or more of the "stored" color samples.

Regardless of which of these techniques, in this conventional example, for the border pixels 208, at least one fragment is generated at each pixel for both primitive 206a and primitive 206b. This means that the fragments 206a which are for the border pixel locations 208 will be processed with parameter values interpolated from the vertex values of the triangle 102a, while the fragments 206b at these same screen space pixel locations will take on parameter values interpolated from the vertex values of the triangle 102b. Each of the fragments 206a and 206b will be processed by separate invocations to the pixel shader, which may correspondingly increase the computational load compared to the aliased example of FIGS. 1A-1B due to the increased number of fragments. However, aliasing artifacts for the sampled parameters may be reduced and the quality of the final image may be improved, because the final display pixel value at each of the border pixels 208 may take on a combination of color values from the different primitives, e.g., weighted based on sample coverage. In this example, the two triangles are simply illustrated as adjacent foreground triangles for purposes of illustration, but each sample's depth value may also be used to more accurately determine with sub-pixel precision which triangles covering the pixel are in the foreground at the individual sample locations, and thus determine more accurate weights than can be determined from sample coverage alone.

The processed fragment values may then be applied to sample locations falling within the primitive that generated it, and discarded for samples falling outside the primitive. By way of example, for a given one of the border pixels 208 that has three samples covered by triangle 206a and one sample covered by triangle 206b (such as the fragment mapped to the top-left corner of triangle 102b in the illustration of FIG. 2B), the final value of the color at the corresponding display pixel may be a blend that is weighted 75% towards the computed values of the corresponding fragment 206a (e.g., ¾ sample coverage for primitive 102a) and 25% towards the computed values of the corresponding fragment 206b (e.g., ¼ sample coverage for primitive 102b). This may reduce aliasing artifacts at the borders of primitives in the final image, and the effect may be most pronounced when the sampled primitives have very different color or depth parameters. For example, if the two primitives belonged to different objects and one of the primitives was in the foreground while the other primitive were in the distant background, the parameters from the different primitives may be markedly different, and the aliasing artifacts would be more pronounced. Anti-aliasing by taking samples at a plurality of different locations within the pixel may smooth out the transitions by allowing the pixel to take on values of primitives mapped to different areas of the pixel.

In the example depicted in FIG. 2A-2B, the number of sample locations is depicted as four for purposes of illustration, but any other number of samples may be taken. Generally speaking, a greater number of samples may increase the quality of anti-aliasing, but at the expense of greater computational requirements. In the conventional example of FIG. 2A-2B, each of the samples is of the same type and is used for at least color and depth, and the pixel 104 defined for the rasterizer correspond one-to-one with the final pixel values in the display buffer that are scanned out to a display.

Figure 3A:
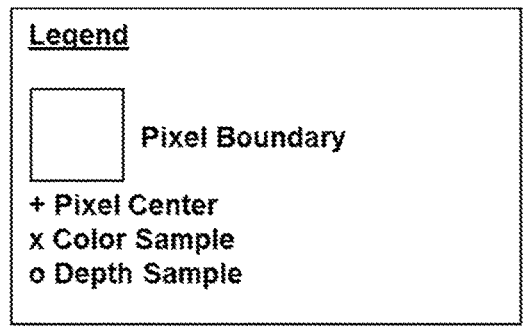
FIGS. 3A-3C are schematic diagrams depicting a graphics rendering process according to aspects of the present disclosure.
Figure 3A:
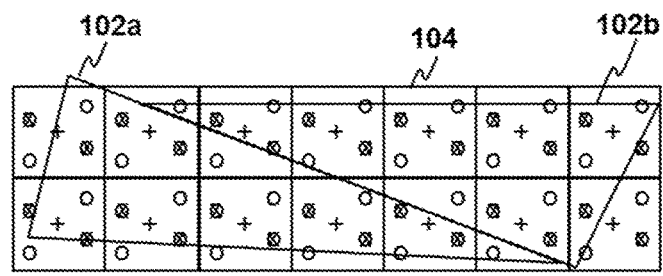
Figure 3B:
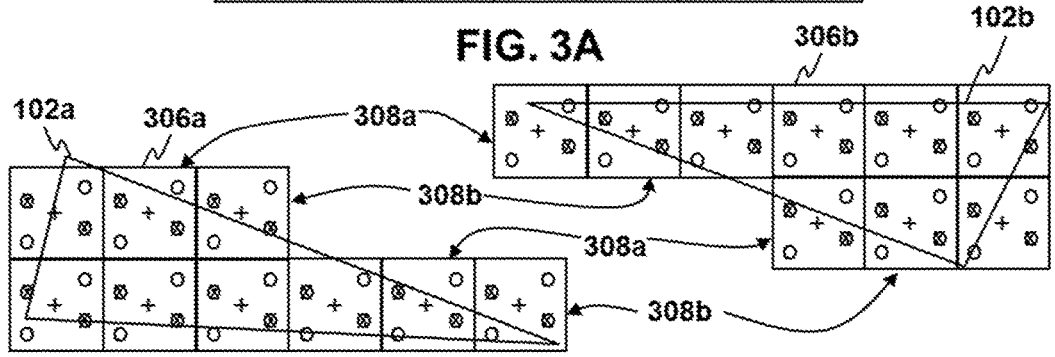
Figure 3C:
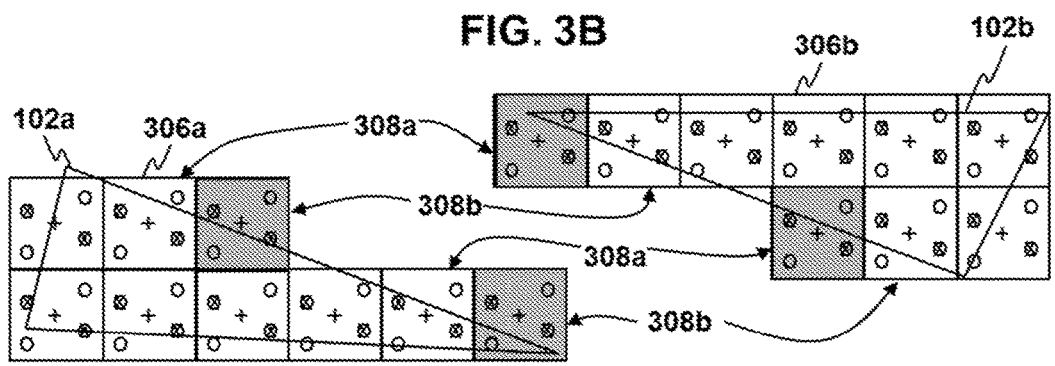

Turning now to FIGS. 3A-3C, an implementation of the present disclosure is depicted. In the illustrated implementation, fewer color samples than depth samples are taken per pixel 104 in accordance with aspects of the present disclosure, resulting in a depth buffer at a higher resolution than the color buffer. According to certain aspects of the present disclosure, this may allow a display buffer to be reconstructed at the resolution of the depth buffer, without requiring a color buffer at the full display buffer resolution. This may provide a variety of benefits, including temporal and spatial anti-aliasing for more efficient rendering for any given display resolution. It is noted that color samples may generally be associated with greater computational requirements, e.g., memory bandwidth, shader overhead, and the like, than depth samples. Certain implementations of the present disclosure may utilize this fact and efficiently render graphics using information from depth samples having a higher spatial precision on the screen than the color samples.

FIG. 3A depicts the same primitives 102a,b mapped to the same screen space pixels 104 as in the previous examples of FIGS. 2A-2B and FIG. 1A-1B. As in FIG. 2A, each pixel 104 is sampled at a plurality of different locations across the pixel. However, in contrast to the example of FIG. 2A, the pixels each contain a fewer number of color samples than depth samples. Stated another way, the color sample count for each of the pixels 104 is lower than the depth or z sample count. The example depicted in FIGS. 3A-3C includes two color samples used for both color and depth, and two samples used only for depth, but other sampling patterns may be used. More generally implementations of the present disclosure may utilize any sampling scheme having a set of pixels that are sampled with one or more color samples and a plurality of depth samples per-pixel.

In this example, there is a plurality of color samples in each pixel, but it is noted that implementations of the present disclosure are applicable to situations where only a single color sample is taken. Moreover, in this example, the sampling is uniformly implemented for each of the illustrated pixels, such that each pixel contains the same number of samples of each type, and at the same locations; however, certain implementations may also use non-uniform sampling schemes for different pixels. For example, it is possible to use a sampling pattern that is different for different pixels, such as different sample locations and/or different sample counts for different pixels. It is also noted that, while each color sample in the example of FIGS. 3A-3C is used also for depth, it is possible to have some samples used only for color. More generally, aspects of the present disclosure are applicable to any scheme whose entire array of pixels comprise a set of pixels wherein each pixel in the set has one or more color samples and a plurality of depth samples, and wherein the number of depth samples for each pixel in the set is greater than the number of color samples.

Turning now to FIG. 3B, the fragments 306a and 306b may be generated from the sampling of the primitives 102a and 102b, respectively, using a sampling technique having one or more color samples in each pixel and a plurality of depth samples in each pixel. That is, fragments 306a in the illustration of FIG. 3B are those screen pixel boundaries where at least one fragment is generated for primitive 102a, and fragments 306b are those screen pixel boundaries where at least one fragment is generated for primitive 102b. Taking a plurality of samples in each screen space pixel 104 at a plurality of different locations again results in a set of border pixels 308a,b that have samples covered by both adjacent primitives 102a and 102b, in this example. In the illustrative example of FIG. 3B, at least one fragment is generated for further processing at a given pixel from a given primitive when at least one of the pixel's samples is covered by the given primitive. In the illustrated example of FIG. 3B, fragments are generated for both primitives 102a and 102b at the border pixels 308a because, for each of these pixels, at least one sample is covered by the primitive when that primitive is projected onto screen space.

It should be noted that, while the sampling pattern for the example of FIG. 3B is not conventional, the manner in which fragments are generated and processed by a pixel shader is conventional. That is, in the example of FIG. 3B, fragments are generated and a pixel is invoked accordingly, anytime at least one sample is covered by the primitive, regardless of the type of sample. However, it is important to note that, for each of the border pixels 308a,b in the illustrated example, at least one depth sample is covered by each of the primitives 102a and 102b, but for these same illustrated border pixels, the color samples are entirely contained within one primitive or the other, but not both. More specifically, in the illustrated example of FIG. 3B, for border pixels 308a the color samples are covered by primitive 102a, but not 102b, while for border pixels 308b the color samples are covered by primitive 102b, but not 102a.

A pixel shader would ordinarily be invoked and the outputs for the fragments would be applied to the samples covered by the primitive that generated the fragments according to their sample type. This means that, for those border pixels depicted in FIG. 3B where fragments are processed by the pixel, but only depth samples are covered, z-depth or stencil values computed by the pixel shader may be applied to the covered depth sample, but no color values. While it is possible to calculate z-depth values with the pixel shader, this is relatively rare and does not occur in most circumstances, since the primary purpose of the pixel shader is usually to perform shading computations that affect the fragments color values, e.g., color value manipulations, lighting values manipulations, and the like. Accordingly, using conventional rasterization and pixel shader invocation techniques in these situations simply results in wasted computations and inefficient pixel shader usage by the GPU, which decreases computational efficiency in the rendering pipeline.

Implementations of the present disclosure recognize this and may improve efficiency in the rendering pipeline by taking into account the nature of covered samples before invoking a pixel shader for the fragment. An illustrative implementation of the present disclosure is depicted in FIG. 3C.

In the illustrated example, the sample coverage ordinarily dictates that color fragments 306a,b should be generated from the primitives 102a,b for the same set of screen pixels as in FIG. 3B. However, in accordance with aspects of the present disclosure, the grayed out boxes in FIG. 3C illustrate fragments/pixels for which a pixel shader may not be invoked for the underlying primitive because, even though at least one sample falls within the primitive, none of these samples are color samples (i.e., there are only depth samples covered). In this example, a pixel shader is invoked at least once for each border pixel 308a for primitive 102a, but not for primitive 102b. Similarly, a pixel shader is invoked at least once for each of the border pixels 308b for primitive

102*b*, but not for primitive 102*a*. This is because only color sample coverage may dictate invocations to the pixel shader during rasterization and pixel processing, in certain implementations of the present disclosure.

For the remaining fragments (i.e., the white/non-grayed out fragments in FIG. 3C), the pixel shader may still be invoked as normal. For each of these fragments, this may involve pixel shading computations on the interpolated parameter values of the fragments, which may be interpolated from the vertex parameter values of the primitive that generated it to the pixel center, to the sample location, or another location of the pixel, depending on the configuration and potentially on the nature of the pixel coverage. If the pixel center falls outside the primitive (even though at least one of the samples falls within the primitive), then the interpolated value may actually be an extrapolation, or centroid sampling may be used to ensure that the value is interpolated to a location within the primitive. Alternatively, some other form of interpolation may be used.

For those grayed out fragments where only a depth sample is within the primitive that generated it, the depth value may be applied during the rasterization stage, but the pixel shader may be bypassed for these fragments. The depth value may be the value interpolated from the vertices of the primitive. These depth values from each primitive may be used in depth testing (and also stencil or other tests), which may be, for example, an early depth test (e.g., EarlyZ), or hierarchical depth test (e.g., Hi-Z), and the depth values may be written to the depth buffer or discarded according to the depth testing. For fragments where a color and depth sample lies within the primitive that generated it, early depth testing during the rasterization stage may remove samples which fail the depth-stencil test, sometimes producing additional fragments which contain only depth samples, in which case pixel shader invocations may also be avoided.

It is noted that implementations of the present disclosure may improve rendering efficiency in situations where, e.g., these early depth tests are configured. Generally speaking, where early depth tests are configured, the depth value of each depth sample is checked during rasterization, and this depth value is either written to the depth buffer or discarded. When this is the case, all useful work of that depth sample has been provided, and any depth-only fragments may be discarded before those fragments are packed for pixel shader invocations.

However, in some situations, "Re-Z" or "Late-Z" depth-stencil is configured. Post-pixel shading depth-stencil test and write is used in certain situations to support pixel shader output which could change the results of that test, by modifying any of the depth, stencil, or sample coverage mask values. In these cases, the pixel shader should still be invoked, even for depth only fragments, in order for the pixel shader to produce the output depth, stencil, or sample coverage mask value.

The shaded values output from the pixel shader may then be applied to each sample during pixel processing stages. The sample values may then be used in different ways depending on the configuration of the system and the rendering pipeline. In some implementations, the multiple samples may be used for spatial and/or temporal anti-aliasing. In further implementations, the depth sample values may be stored in a full resolution depth buffer, and the color sample values may be stored in a partial resolution color buffer, e.g., with the resolutions corresponding to the number of samples, and a final display image may then be determined for the display buffer at the full z-resolution, using color values derived the partial resolution color buffer during late stage framebuffer/display buffer operations. In yet further implementations, some combination of these may be used.

Since it is often desirable to avoid modifying the z-depth, sample coverage mask, or stencil values in the pixel shader, computationally expensive invocations to a pixel shader and their associated shading computations may be avoided for these covered primitives at pixels where only depth samples are covered by the primitive. Since there may be many pixels falling on primitive borders within a frame, and many of these border pixels may have different sample locations falling on different visible primitives, yet color samples falling within only the one visible primitive, many computations may be avoided in a rendering pipeline by taking into account sample type before invoking a pixel shader. In some implementations of the present disclosure, the net effect may be a 10-20% improvement in efficiency.

It should be noted that there are some instances where a pixel shader should be invoked, even when the pixel has only depth samples and no color samples covered by the primitive. For example, in some instances the pixel shader may be configured to implement a pixel kill (or fragment kill) for the fragment (e.g., based on an output alpha blend factor test). In further instances, the pixel shader may be configured to export a Z or stencil value for the fragment, which means that the pixel shader may need to be invoked to write this Z/stencil value to the covered depth sample. In yet further instances, the pixel shader may be configured to alter the sample mask. In any of these three conditions are present, the pixel shader should still be invoked. However, if these conditions are absent, then the pixel shader invocations and the associated computations would be essentially useless.

Figure 4:
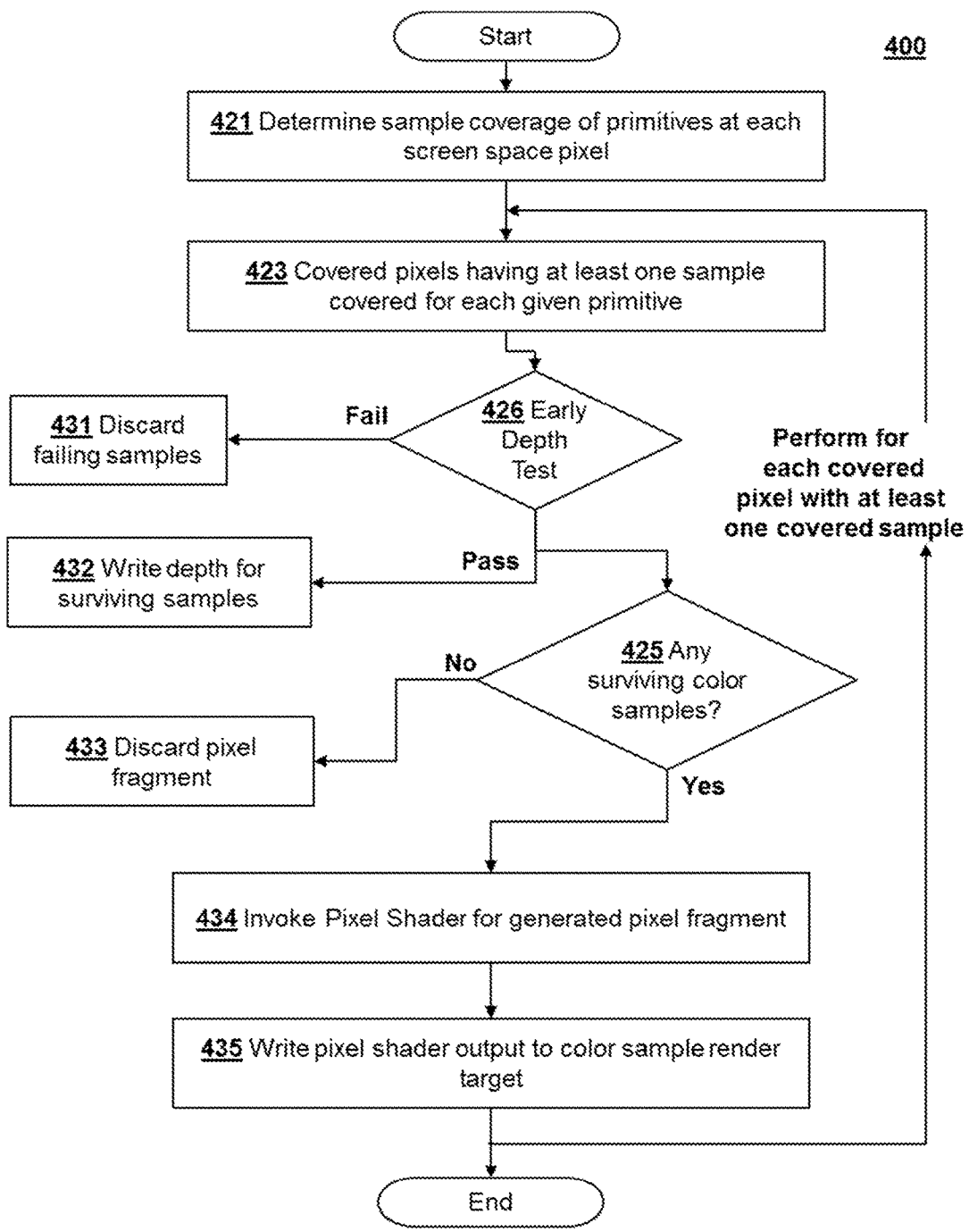
FIG. 4 is a flow diagram depicting method of rendering graphics according to aspects of the present disclosure.

FIG. 4 depicts an example method 400 of processing graphics in accordance with aspects of the present disclosure. The method 400 may be implemented within a graphics rendering pipeline to avoid invoking a pixel shader in situations similar to that depicted above with respect to FIG. 3C.

As indicated at 421, the method may involve sampling primitives using a plurality of samples for each screen space pixel. The plurality of samples may include one or more color samples and a plurality of depth samples. In certain implementations, one color sample and a plurality of depth samples are taken for each pixel. In other implementations, the plurality of samples includes both a plurality of color samples and a plurality of depth samples in each pixel for which the method 400 is applied, in which case the color sample count in each of the pixels should be less than the depth sample count. In some implementations, the screen may be sampled non-uniformly, and different screen space pixels may include different sample counts and/or different sample locations. Accordingly, it is not a strict requirement that every screen pixel include a plurality of samples at 421, so long as each screen space pixel in at least some set of pixels defined in screen space for the rasterizer includes a plurality of samples. In certain implementations, the sample coverage determined at 421 may be performed by a scan converter in a rasterization stage of a graphics rendering pipeline to sample primitives projected onto screen space at each defined screen space pixel.

Figure 1B:
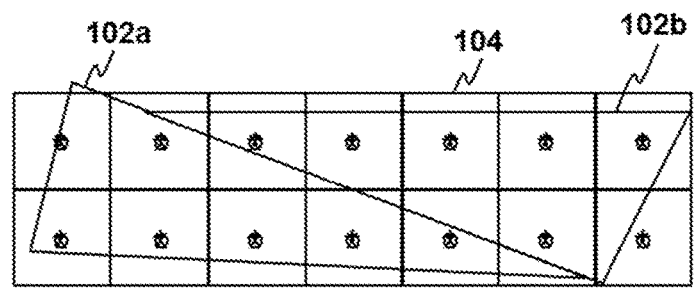
Figure 1B:
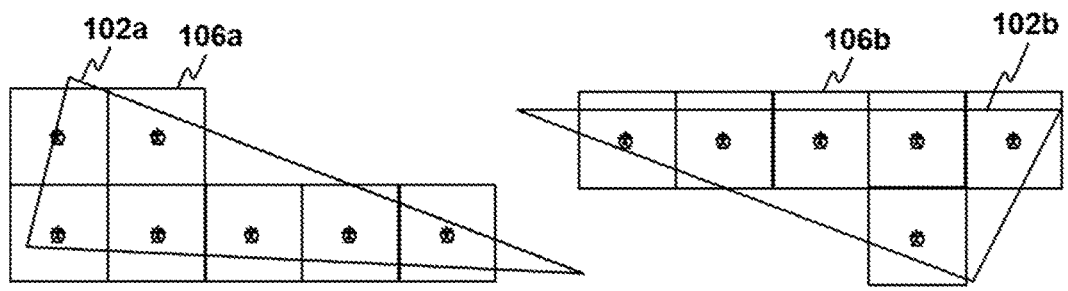
Figure 2B:
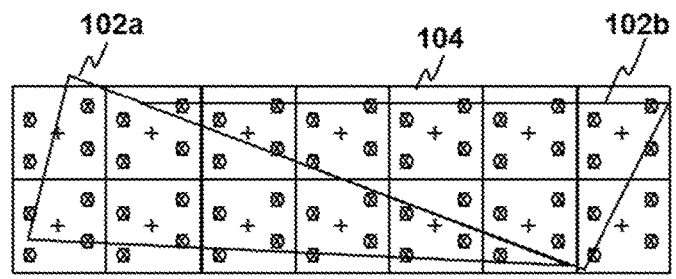
Figure 2B:
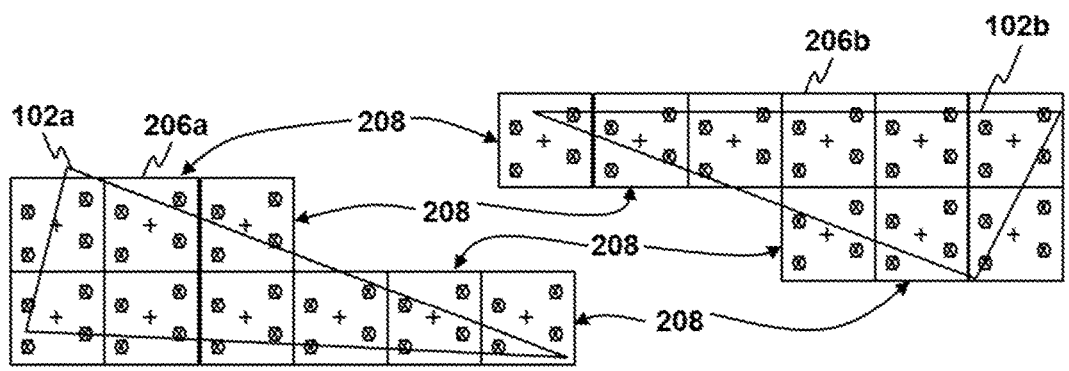

Taking the samples may result in a set of pixels whose samples are covered by the primitives, as indicated at 423. In the illustration of FIG. 4, the covered pixels 423 for each given primitive refers to only those pixels having at least one sample covered by the primitive. Where a primitive border crosses within a pixel boundary, it is possible for only some of the samples to be covered by the given primitive, e.g., as described above with respect to FIGS. 1-3. It is also possible for a triangle boundary to intersect a pixel boundary without having any samples covered by the triangle. However, since this would not ordinarily result in a pixel shader invocation anyway, this situation is ignored for purposes of explanation.

As indicated at 426, an early depth test may be performed for each depth sample covered by the given primitive. This may involve, e.g., comparing an interpolated depth of each sample from the vertices of the given primitive to a current depth value for those sample coordinates. Each depth sample that fails the depth test may be discarded, as indicated at 431, while those depth samples that pass, e.g., those surviving depth samples, may be applied to the depth sample of the covered pixel by writing the depth value to the depth buffer, as indicated at 432.

If there are samples covered by the primitive which pass the depth test, the method 400 may still determine the nature of the surviving covered samples before invoking the pixel shader, as indicated at 425. Conventionally, even if an early depth test were used, the pixel shader would be invoked anytime at least one of the samples of the pixels passes the depth test. In the illustrated implementation depicted in FIG. 4, however, the system may check to see if any of those samples which survive the depth test are color samples. If it is determined that there are no color samples left that are covered by the primitive, the fragment for the pixel may be discarded, and the pixel shader is not invoked, as indicated at 433.

If, after all surviving samples have been determined by the early test, there is at least one surviving color sample that is covered by the given primitive, then a pixel shader may be invoked for the generated pixel fragment, as indicated at 434. Pixel shading computations may be performed in accordance with the pixel shader invocations, and the output of the pixel shader may then be applied to one or more render targets at the color sample location, e.g., in a color buffer, as indicated at 435. This process may be performed for each covered pixel that has at least one sample covered in the manner described above. In certain situations, this may mean that, even when a depth sample of a pixel is covered by a given primitive and passes all depth-stencil tests, a pixel shader invocation and the associated pixel shader computations may be avoided for the pixel for the given primitive. In a scene with many triangles overlapping pixel boundaries, this may provide a large boost in performance and rendering efficiency.

It is noted that stencil tests and stencil writes have been omitted from the above for purposes of explanation, but it is also possible for the early test to compare stencil values at the depth samples and for stencil values to applied to the samples to be written accordingly.

The process of determining whether to invoke the pixel shader in accordance with the nature of the sample coverage may be performed for each covered pixel in a given primitive, and similarly may be performed for the covered pixels of each primitive in a scene. It is noted that the operations for different ones of the covered pixels may be performed in parallel by a processing unit, e.g., a GPU.

According to aspects of the present disclosure, considering whether or not to invoke the pixel shader for a given covered pixel may also take into account other considerations beyond solely whether there are any covered color samples that pass early depth tests. For example, there are some situations where the pixel shader might still be invoked for a given fragment for a pixel having samples covered by the given fragment, even though there are no covered color samples (e.g., only depth samples are covered). In some implementations, determining whether or not to invoke a pixel shader may also include determining whether or not the pixel shader is configured to kill the covered pixel (or kill the fragment). In some implementations, determining whether or not to invoke a pixel shader may also include determining whether or not the pixel shader is configured to export a Z or stencil value for the covered depth sample. In some implementations, determining whether or not to invoke a pixel shader may also include determining whether or not the pixel shader is configured to alter the sample mask. In these implementations, the early depth test may be omitted, e.g., a depth test may be performed after the pixel shader for each covered sample. In these situations, the pixel shader may be invoked in a conventional manner.

Figure 5:
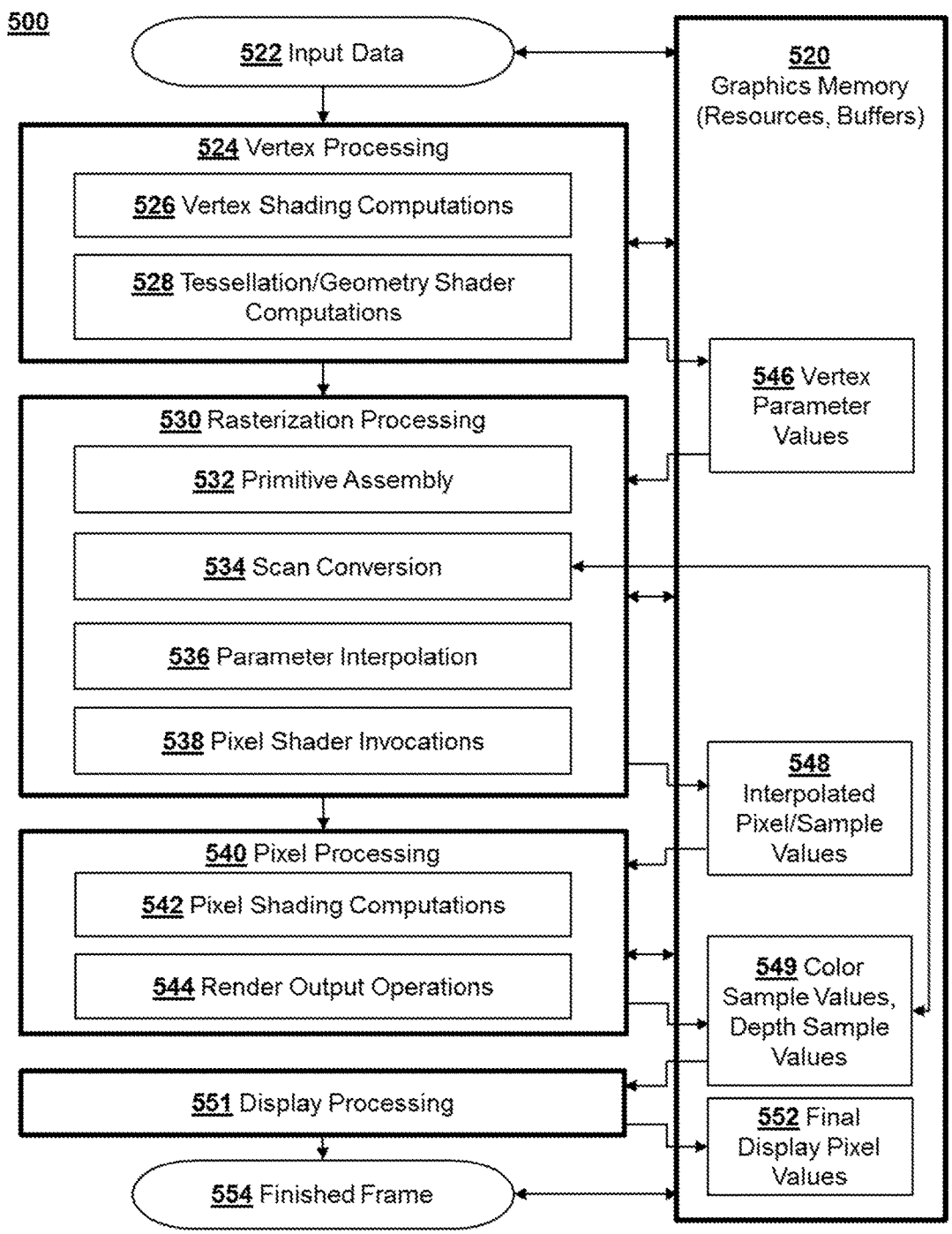
FIG. 5 is a flow diagram depicting a graphics rendering pipeline according to aspects of the present disclosure.

FIG. 5 depicts an illustrative graphics processing method 500 in accordance with a rendering pipeline configured to implement aspects of the present disclosure. The illustrative rendering pipeline depicted in FIG. 5 may incorporate the method 400 of FIG. 4 in order to minimize invocations to a pixel shader in accordance with aspects of the present disclosure.

The rendering pipeline 500 may be configured to render graphics as images that depict a scene which may have a preferably three-dimensional geometry in virtual space (sometimes referred to herein as "scene space"), but potentially a two-dimensional geometry. Throughout the rendering pipeline, data may be read from and written to one or more memory units, which are generally denoted in FIG. 5 as graphics memory 520. The graphics memory may contain video memory and/or hardware state memory, including various buffers and/or graphics resources utilized in the rendering pipeline. One or more individual memory units of the graphics memory 520 may be embodied as one or more video random access memory unit(s), one or more caches, one or more processor registers, etc., depending on the nature of data at the particular stage in rendering.

Accordingly, it is understood that graphics memory 520 refers to any processor accessible memory utilized in the graphics rendering pipeline. A processing unit, such as a specialized GPU, may be configured to perform various operations in the pipeline and read/write to the graphics memory 520 accordingly.

The early stages of the pipeline may include operations performed in scene space before the scene is rasterized and converted to screen space as a set of discrete picture elements suitable for output on the pixels display device. Throughout the pipeline, various resources contained in the graphics memory 520 may be utilized at the pipeline stages and inputs and outputs to the stages may be temporarily stored in buffers contained in the graphics memory before the final values of the images are determined.

The rendering pipeline may operate on input data 522, which may include one or more virtual objects defined by a set of vertices that are set up in scene space and have geometry that is defined with respect to coordinates in the scene. The input data 522 utilized in the rendering pipeline 500 may include a polygon mesh model of the scene geometry whose vertices correspond to the primitives processed in the rendering pipeline in accordance with aspects of the present disclosure, and the initial vertex geometry may be set up in the graphics memory during an application stage implemented by a CPU. The early stages of the pipeline may include what is broadly categorized as a vertex processing stage 524 in FIG. 5, and this may include various computations to process the vertices of the objects in scene space geometry. This may include vertex shading computations 526, which may manipulate various parameter values of the vertices in the scene, such as position values (e.g., X-Y coordinate and Z-depth values), color values, lighting values, texture coordinates, and the like. Preferably, the vertex shading computations 526 are performed by one or more programmable vertex shaders. The vertex processing stage may also optionally include additional vertex processing computations, such as tessellation and geometry shader computations 528, which may be used to subdivide primitives and generate new vertices and new geometries in scene space. Once the stage referred to as vertex processing 524 is complete, at this stage in the pipeline the scene is defined by a set of vertices which each have a set of vertex parameter values 546, which may be stored in vertex buffers in the graphics memory.

The pipeline 500 may then proceed to rasterization processing stages 530 associated with converting the scene geometry into screen space and a set of discrete picture elements, i.e., pixels used during the rendering pipeline, although it is noted that the term pixel does not necessarily mean that the pixel corresponds to a display pixel value in the final display buffer image. The virtual space geometry may be transformed to screen space geometry through operations that may essentially compute the projection of the objects and vertices from scene space to the viewing window (or "viewport) of the scene that is made up of a plurality of discrete screen space pixels sampled by the rasterizer. The rasterization processing stage 530 depicted in FIG. 5 may include primitive assembly operations 532, which may set up the primitives defined by each set of vertices in the scene. Each vertex may be defined by an index, and each primitive may be defined with respect to these vertex indices, which may be stored in index buffers in the graphics memory 520. The primitives should include at least triangles that are defined by three vertices each, but may also include point primitives, line primitives, and other polygonal shapes. During the primitive assembly stage 532, certain primitives may optionally be culled. For example, those primitives whose indices indicate a certain winding order may be considered to be back-facing and may be culled from the scene.

After primitives are assembled, the rasterization processing stages may include scan conversion operations 534, which may sample the primitives at each discrete pixel and generate fragments from the primitives for further processing when the samples are covered by the primitive. In implementations of the present disclosure, for at least some of the screen space pixels, scan conversion 534 may take a plurality of samples within each pixel. The plurality of samples within each of these pixels may include one or more color samples and a plurality of depth samples. In certain implementations, different pixels may be sampled differently. For example, some edge pixels may contain a lower sampling density than center pixels to optimize certain aspects of the rendering for head mounted displays (HMDs). In some implementations of the present disclosure, scan conversion may also include pre-pixel-shader depth tests and depth updates in some rendering configurations. In these cases, depth samples may be tested, their values may be checked against depth values in a depth buffer (and possible stencil buffer), and the depth sample values 549 in the depth buffer may be updated when they pass the tests (and possibly stencil values may be updated in a stencil buffer based on a stencil test).

The fragments (or "pixels") generated from the primitives during scan conversion 534 may have parameter values that may be interpolated to the locations of the pixels from the vertex parameter values 546 of the vertices of the primitive that created them. The rasterization stage 530 may include parameter interpolation operations 536 stage to compute these interpolated fragment parameter values 548, which may be used as inputs for further processing at the later stages of the pipeline, and parameter interpolation may also include interpolation of depth values from the vertex depth values primitives covering the depth samples, which may or may not be used as input fragment values to the pixel shader, depending on the configuration.

The pipeline 500 may include further pixel processing operations, indicated generally at 540 in FIG. 5, to further manipulate the interpolated parameter values 548, as well perform further operations determining how the fragments and/or interpolated values contribute to the final pixel values for display. Some of these pixel processing tasks may include pixel shading computations 542 that may be used to further manipulate the interpolated parameter values 548 of the fragments. The pixel shading computations may be performed by a programmable pixel shader, and pixel shader invocations 538 may be initiated based on the sampling of the primitives during the rasterization processing stages 530. In implementations of the present disclosure, the pixel shader invocations 538 may be determined in accordance with the method 400 of FIG. 4, and a pixel shader may not be invoked for certain covered pixels, when none of the covered samples are color samples.

The pixel shading computations 542 may output values to one or more buffers in graphics memory 520, sometimes referred to as render targets. In some implementations, multiple render targets (MRTs) may be used, in which case the pixel shader may be able to output multiple independent values for each per-pixel or per-sample output. The pixel processing 540 may include render output operations 544, which may include what are sometimes known as raster operations (ROP). Render output operations 544 may include depth tests, stencil tests, and/or other operations in order to determine whether fragment values processed by the pixel shader, and possibly interpolated depth values not processed by the pixel shader, should be written to a color buffer and/or depth buffer, and some of the render output operations may be performed after the pixel shading computations 542 or before the pixel shading computations 542 as an optimization. The final color values and depth values per sample may be determined in accordance with the render output operations 544, which may be stored as one or more back buffers to the display buffer (sometimes known as a "frame buffer").

According to certain aspects, the method 500 may also include display processing 551, which may process an entire scene's worth of draw calls computed into color/depth buffers according the stages described above, and determine a final array of display pixel values 552 that may make up a finished graphics frame 554 for presentation on a display. Display processing 551 may be a final step that occurs after many draw commands flow through the aforementioned stages, and may include rendering full screen passes (e.g., trivial screen-aligned polygons which cover the entire screen), or computational jobs which may work directly on the color/depth sample buffer data 549. In certain implementations, a higher resolution color buffer output may be resolved from a lower resolution depth buffer using during display processing 551. In accordance with certain aspects, it is also possible to apply spatial and/or temporal anti-aliasing during this stage. The finished frame 554 may be stored in a display buffer and may optionally be scanned out of the display buffer for presentation on a display device in real-time.

It is noted that any stages of the pipeline may be implemented in hardware modules, software modules (e.g., one or more individual or unified shader programs), or some combination thereof.

Figure 6:
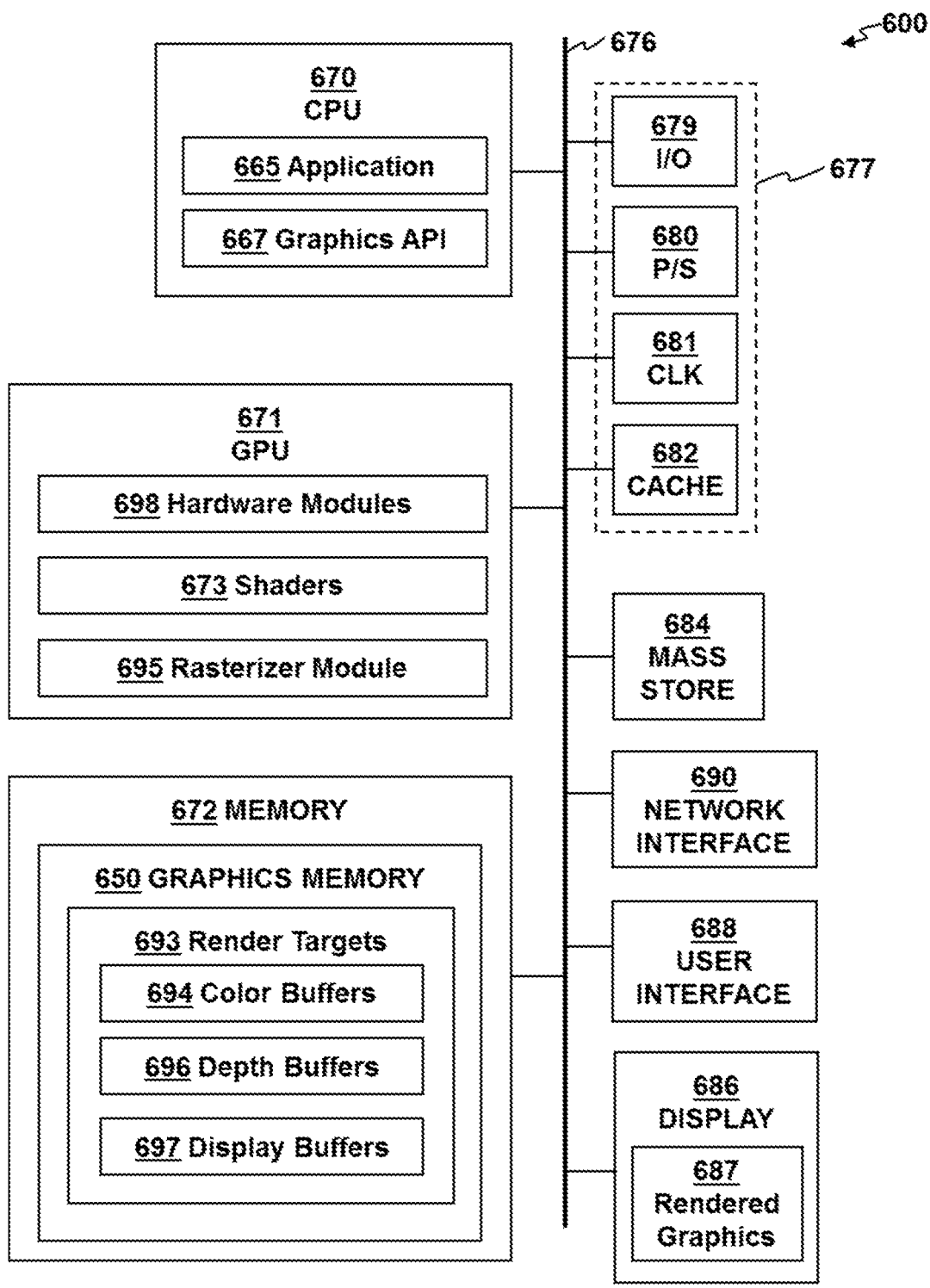
FIG. 6 is a schematic diagram depicting a graphics rendering system according to aspects of the present disclosure.

Turning now to FIG. 6, an illustrative example of a computing system 600 that is configured to render graphics in accordance with aspects of the present disclosure is depicted. The system 600 may be configured to render graphics for an application 665 with in accordance with aspects described above. According to aspects of the present disclosure, the system 600 may be an embedded system, mobile phone, personal computer, tablet computer, portable game device, workstation, game console, and the like.

The system may generally include a processor and a memory configured to implemented aspects of the present disclosure, e.g., by performing a method having features in common with the methods of FIGS. 4 and/or 5. In the illustrated example, the processor includes a central processing unit (CPU) 670, a graphics processing unit (GPU) 671, and a memory 672. The memory 672 may optionally include a main memory unit that is accessible to both the CPU and GPU, and portions of the main memory may optionally include portions of the graphics memory 650. The CPU 670 and GPU 671 may each include one or more processor cores, e.g., a single core, two cores, four cores, eight cores, or more. The CPU 670 and GPU 671 may be configured to access one or more memory units using a data bus 676, and, in some implementations, it may be useful for the system 600 to include two or more different buses.

The memory 672 may include one or more memory units in the form of integrated circuits that provides addressable memory, e.g., RAM, DRAM, and the like. The graphics memory 650 may temporarily store graphics resources, graphics buffers, and other graphics data for a graphics rendering pipeline. The graphics buffers may include, e.g., one or more vertex buffers for storing vertex parameter values and one or more index buffers for storing vertex indices. The graphics buffers may also include a one or more render targets 693, which may include both color buffers 694 and depth buffers 696 holding pixel/sample values computed according to aspects of the present disclosure. In certain implementations, the color buffers 694 and/or depth buffers 696 may be used to determine a final array of display pixel color values to be stored in a display buffer 697, which may make up a final rendered image intended for presentation on a display. In certain implementations, the display buffer may include a front buffer and one or more back buffers, and the GPU 671 may be configured to scanout graphics frames from the front buffer of the display buffer 697 for presentation on a display 686.

The CPU may be configured to execute CPU code, which may include an application 665 utilizing rendered graphics (such as a video game) and a corresponding graphics API 667 for issuing draw commands or draw calls to programs implemented by the GPU 671 based on the state of the application 665. The CPU code may also implement physics simulations and other functions.

The GPU may be configured to operate as discussed above with respect illustrative implementations of the present disclosure. To support the rendering of graphics, the GPU may execute shaders 673, which may include vertex shaders and pixel shaders. The GPU may also execute other shader programs, such as, e.g., geometry shaders, tessellation shaders, compute shaders, and the like. The GPU may also include specialized hardware modules 698, which may include one or more texture mapping units and/or other hardware modules configured to implement operations at one or more stages of a graphics pipeline similar to the pipeline depicted in FIG. 5, which may be fixed function operations. The shaders 673 and hardware modules 698 may interface with data in the memory 650 and the buffers 693 at various stages in the pipeline before the final pixel values are output to a display. The shaders 673 and/or other programs configured to be executed by the processor of the system 600 to implement aspects of the graphics processing techniques described herein may be stored as instructions in a non-transitory computer readable medium. The GPU may include a rasterizer module 695, which may be optionally embodied in a hardware module 698 of the GPU, a shader 673, or a combination thereof. The rasterization module 695 may be configured to take multiple samples of primitives for screen space pixels and invoke one or more pixel shaders according to the nature of the samples, in accordance with aspects of the present disclosure.

The system 600 may also include well-known support functions 677, which may communicate with other components of the system, e.g., via the bus 676. Such support functions may include, but are not limited to, input/output (I/O) elements 679, power supplies (P/S) 680, a clock (CLK) 681, and a cache 682. The apparatus 600 may optionally include a mass storage device 684 such as a disk drive, CD-ROM drive, flash memory, tape drive, blu-ray drive, or the like to store programs and/or data. The device 600 may also include a display unit 686 to present rendered graphics 687 to a user and user interface unit 688 to facilitate interaction between the apparatus 600 and a user. The display unit 686 may be in the form of a flat panel display, cathode ray tube (CRT) screen, touch screen, head mounted display (HMD) or other device that can display text, numerals, graphical symbols, or images. The display 686 may display rendered graphics 687 processed in accordance with various techniques described herein. The user interface 688 may one or more peripherals, such as a keyboard, mouse, joystick, light pen, game controller, touch screen, and/or other device that may be used in conjunction with a graphical user interface (GUI). In certain implementations, the state of the application 665 and the underlying content of the graphics may be determined at least in part by user input through the user interface 688, e.g., in video gaming implementations where the application 665 includes a video game.

The system 600 may also include a network interface 690 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these.

FIGS. 7A-7D illustrate examples of a sampling pattern is depicted, along with corresponding display buffers that may be computed from the sampling pattern in accordance with certain implementations of the present disclosure. FIGS. 7A-7D illustrate certain aspects of why it may be advantageous to sample pixels with a fewer number of color samples than depth samples in certain implementations of the present disclosure.

As shown in FIG. 7A, screen space may be defined by a plurality of pixels 104, e.g., pixel boundaries or pixel coordinates for the rasterizer, which may each include a plurality of samples in accordance with certain aspects of the present disclosure. A plurality of samples may be taken for each pixel 104, and each sample may have an associated value determined during the rendering process, in accordance with certain aspects of the present disclosure. As shown in FIG. 7A, the plurality of samples in each screen space pixel 104 may include a fewer number of color samples than depth samples. That is, the depth sample count may be higher than the color sample count in each screen space pixel 104. During rendering, values computed for individual samples from the rasterization of primitives and pixel shading of corresponding fragments may be determined in accordance with certain principles herein, and only the illustrated color samples may be used to shade color values during rendering, while some of the depth samples may be used only for depth.

FIG. 7B is a schematic diagram depicting a high resolution depth buffer 711 that may be computed using the sampling process depicted in FIG. 7A. FIG. 7C depicts a color buffer 713 that may be computed using the same sampling process depicted in FIG. 7A. As can be seen in the figures, in implementations of the present disclosure, the color buffer 713 that is rendered to during pixel processing may have a lower resolution than the depth buffer 711 that is rendered to. FIG. 7D depicts a final display buffer 715 that may be reconstructed from the full resolution depth buffer 711 using the color values derived from the partial resolution color buffer 713.

Broadly speaking, the values in the depth buffer 711 may be used during the rendering process to determine with full spatial precision which color values in the color buffer 713 should be applied to which pixels in the full display buffer 715, without rendering a unique color value for each display pixel in the full display resolution 715. Preferably, the full display resolution has a display pixel density for 4 k resolution (e.g., 3840×2160) so that the rendered display image is suitable for what are commonly known as ultra-high definition displays. However, aspects of the present disclosure are applicable to improving rendering efficiency for any display buffer resolution by utilizing a partial resolution color buffer having a fewer number of rendered color samples or color pixel values than the number of display pixels in the display buffer. By way of example, and not by way of limitation, the full display resolution may be standard high definition (e.g., on the order 2 k horizontal resolution) and graphics may be rendered in the standard HD resolution with improved efficiency by utilizing a lower resolution color buffer than the full HD resolution.

It should be noted that memory bandwidth requirements and computational overhead associated with computing values for color samples may be generally higher than those for depth. For example, is common for modern rendering techniques to output more color data per pixel via Multiple Render Targets (MRTs) than depth data per pixel (for example 160-bits total of color data vs. 32-bit depth), which puts a greater burden on memory resources at a given color buffer resolution vs. a comparable depth buffer resolution during the rendering pipeline. Moreover, since a pixel shader generally must be invoked for color samples so that shading computations and associated parameter values may be computed and applied to each color sample falling within a pixel's boundaries, pixel shader overhead may be significantly reduced by utilizing fewer color samples and a correspondingly lower resolution color buffer, as shown in FIG. 7C, then applying those color samples to the full resolution display buffer containing the final frame image accordingly. Often, depth values are not modified by a pixel shader during pixel processing, so shader overhead may be reduced in certain situations utilizing the sampling scheme depicted in FIG. 7A, by avoiding pixel shader invocations unless a color sample falls within a screen space pixel's boundaries for a given primitive.

In order to illustrate certain aspects of the present disclosure, FIG. 8A depicts an example of a set of screen space pixels 104 used to rasterize a pair of primitives 817a and 817b, using a sampling pattern across the screen space pixels similar to the example depicted in FIG. 7A. In the example depicted in FIG. 8A, the primitive 817a is a background triangle that is partially occluded by the foreground triangle 817b to illustrate certain aspects of how a full resolution depth buffer may be used to accurately reconstruct color values for a full resolution display buffer using only a partial resolution color buffer, e.g., as shown in FIGS. 7A-7D. In this simplified example, it is assumed that the triangles 817a and 817b are not further occluded by other primitives in the scene.

As shown in FIG. 8A, one of the screen space pixels 104a is covered by both of the primitives 817a and 817b based on the depth sample coverage. "Covered" means that, when the primitive's boundaries are projected to screen space, the sample falls within the primitive's boundaries. However, only one color sample is used in this screen space pixel 104a (color and depth sample in the top left corner), and, in this example, the color sample of screen space pixel 104a is covered by only triangle 817a. Since this color sample is not otherwise occluded, based on the depth of this sample, this sample will take on color values computed for the primitive 817a in the color buffer. Similarly, for screen space pixel 104b in the illustrated example, one color sample is taken (top left corner) which is covered by triangle 817b. Since this color sample is not otherwise occluded, based on the depth of this sample, this sample will take on color values computed for the primitive 817b in the color buffer, e.g., color buffer similar to that shown in FIG. 7C. Likewise, the depth samples for the screen space coordinates of these same color samples will take on depth values computed from their respective primitives.

As shown in FIG. 8A, a greater number of depth samples are taken for the rasterizer pixel 104a than color samples. In the illustrated example, the background triangle 817a is occluded by triangle 817b at the depth sample in the top right corner of rasterizer pixel 104a. This means that this sample will take on a value in the depth buffer computed for the triangle 817b, since the depth sample covered by triangle 817a will fail a depth test and be discarded. As a consequence of this, the value may be significantly different (i.e., lower depth/closer to the screen) than the value for the top left depth sample for which the color sample is computed. Also note that this depth sample will take on a value that may be similar or identical to the depth value of the color sample covered by triangle 817b.

FIG. 8B illustrates how this information may be used to efficiently reconstruct a high resolution display buffer in more detail. FIG. 8B depicts the sample primitives 817a and 817b overlaid over the same samples, but now the reconstructed display buffer pixels intended for presentation on a display are depicted overlying those samples. In this example, the display buffer has a resolution equivalent to the full resolution of the depth buffer made up of an array of depth samples. For the display buffer pixel 819 which corresponds to that portion of the triangle 817a that is occluded by triangle 817b, it is desirable that this display pixel derive its color values from a color sample taken from the foreground triangle 817b, not the occluded triangle 817a. In this example, this means that display pixel 819 may derive its color values from the color sample at 821, even though this sample is significantly farther away in screen space (i.e., farther away vertically/horizontally in X-Y screen coordinates) than other color samples. In fact, it may have been computed from a fragment or quad fragment at a completely different location in screen space. However, the appropriate color sample 821 from which to derive a display pixel's values may be determined based on the depth information. Since the depth at 819 and within the triangle 817*b* are different from the surrounding areas, this indicates that the color for each of these display pixels should be derived from within the area having the different depth, e.g., color sample 821 in this example, even though the color sample from triangle 817*a* is closer in screen space and immediately adjacent to the pixel in this example.

In order to further illustrate certain aspects of the present disclosure, FIG. 8C-8D depict a schematic diagram of a simplified process flow for computing the full resolution display buffer values and partial resolution color buffer values from the primitives depicted in FIG. 8A. FIG. 8C depicts an illustrative process for primitive 817*a*, while FIG. 8B depicts an illustrative process for primitive 817*b*. The example process flows in FIGS. 8C-8D may be a simplified visualization of how data may flow through a graphics pipeline, such as in accordance with the rendering pipeline of FIG. 5.

As shown in FIG. 8C, the primitive 817*a* is sampled with a plurality of samples in the screen space pixel 104*a* (or rasterization pixel). This single pixel does not necessarily correspond to a single pixel of the final display image, but its defined boundaries may actually encompass multiple display image pixels, e.g., four in this example, when the full resolution graphics frame is reconstructed. As shown at a), the primitive is rasterized and sample coverage is determined for the triangle. In this example, three samples are covered by the triangle, the lone color sample in the pixel and three depth samples. As shown at b) of FIG. 8C, values are computed for each of the sample values for the corresponding parameter, i.e., color parameters and/or other parameters which affect color may be manipulated by a pixel shader for the covered color sample to determine a set of color values for this sample, while depth values may be computed for each of the three depth samples, and these values may or may not be values exported by the pixel shader. The values may be computed using parameters interpolated from the vertices of the primitive. As shown in FIG. 8C, since the sample in the bottom right of the rasterizer pixel is not covered by the primitive, no depth values will be applied to this sample from this particular triangle 817*a*, as shown in FIG. 8C. The values may undergo per-sample operations, which may include a depth test for each of the samples before final sample values from the fragment/pixel are written to the samples in the depth buffer. As shown at c) in FIG. 8C, in this example, the top right sample fails the depth test, and its depth value may be discarded, because it is occluded by the depth value for the triangle 817*b*. It should be noted that while the depth test is depicted as being after the final sample values are computed in FIG. 8C, it may optionally be performed before, as an optimization to avoid unnecessary computations for samples/pixels that may fail the tests and be discarded. As shown in d) at FIG. 8C, the computed sample values may be written to the full resolution depth buffer and the partial resolution color buffer.

As shown in FIG. 8D, a similar process is applied to primitive 817*b*. As in FIG. 8C, the primitive 817*b* is rasterized using a sampling scheme having a fewer number of color samples than depth samples in each pixel. Color and depth values are computed for each sample, and they may be depth tested before they are written to the color samples and depth samples in the display buffer. This triangle 817*b* is covered by multiple pixels in this example; however, the primitive covers only depth samples in the top pixel and pixel shader computations may be omitted for this pixel in certain situations. The bottom pixel contains the sole covered color sample, and this sample may be shaded using a pixel shader. As shown in c), the samples may be depth tested before they are stored in the color/depth display buffers, as shown in FIG. 8D. Because the depth value at the sample coordinates of the color sample is similar to all those depth samples covered by the primitive, final display pixel colors may be efficiently derived from color sample for pixels at all those depth sample coordinates, with high spatial precision provided by the depth samples that avoids the need to shade color values at the full resolution.

It is noted that while the above is a detailed example of how a sampling scheme may utilize many samples only for depth, such a multiple sampling scheme may be useful for other purposes. For example, temporal anti-aliasing may be implemented between frames, reconstructing full resolution color derived at depth samples in different frames. The multiple samples may also be useful for other anti-aliasing schemes.

Additional Aspects

Additional aspects of the present disclosure include method of rendering graphics, the method comprising: determining a sample coverage of a first primitive at a first pixel, wherein the first pixel includes a plurality of samples, wherein the plurality of samples include one or more color samples and a plurality of depth samples, wherein it is determined in said determining the sample coverage that the plurality of samples of the first pixel include one or more covered samples that are covered by the first primitive; determining whether the covered samples include at least one of the color samples of the first pixel; invoking a pixel shader for the first pixel for the first primitive if said determining determines that the covered samples include at least one of the color samples; and not invoking the pixel shader for the first pixel for the first primitive if said determining determines that the covered samples do not include at least one of the color samples Another additional aspect is a computer-readable medium having computer executable instructions embodied therein that, when executed, implement the foregoing method.

A further aspect is an electromagnetic or other signal carrying computer-readable instructions for performing the foregoing method.

Yet another aspect is a computer program product downloadable from a communication network and/or stored on a computer-readable and/or microprocessor-executable medium, characterized in that it comprises program code instructions for implementing the foregoing method.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method of rendering graphics with a processing unit, the method comprising:
   invoking a pixel shader for a first pixel for a first primitive when one or more covered samples include at least one of one or more color samples, wherein the first pixel includes a plurality of samples, wherein the plurality of samples includes the one or more color samples and a plurality of depth samples, wherein the plurality of samples of the first pixel includes the one or more covered samples that are covered by the first primitive; and
   not invoking the pixel shader for the first pixel for the first primitive when the one or more covered samples do not include at least one of the one or more color samples but do include at least one depth sample of the plurality of depth samples;
   deriving a color value, for the first primitive, for a display pixel not associated with a color sample but associated with a depth sample by assigning a color value of a color sample at a same depth value as the depth sample.

2. The method of claim 1, wherein the one or more color samples of the first pixel is a plurality of color samples and a color sample count of the first pixel is less than a depth sample count of the first pixel.

3. The method of claim 1, further comprising:
   performing an early depth test for at least one of the covered samples to determine whether the covered samples are depth occluded.

4. The method of claim 1, further comprising, after said invoking a pixel shader:
   performing pixel shader computations for at least one fragment generated for the first pixel from the first primitive.

5. The method of claim 1, further comprising, after said invoking a pixel shader:
   performing pixel shader computations for at least one fragment generated for the first pixel from the first primitive, and
   after said performing pixel shader computations, applying at least one color value of at least one fragment computed in the pixel shader computations to at least one color sample of the first pixel covered by the first primitive.

6. The method of claim 1, wherein, when a plurality of the color samples are covered by the primitive, the method further comprises, after said invoking a pixel shader:
   performing pixel shader computations for one or more single sample fragments respectively generated for each of the plurality of color samples covered by the primitive, and
   after said performing pixel shader computations, applying a respective color value of each of the single sample fragments computed in the pixel shader computations to each of the color samples covered by the first primitive, respectively.

7. The method of claim 1, wherein, when a plurality of the color samples are covered by the primitive, the method further comprises, after said invoking a pixel shader:
   performing pixel shader computations on one fragment generated for each of the plurality of color samples covered by the primitive, and
   after said performing pixel shader computations, applying a color value of the fragment computed in the pixel shader computations to each of the color samples covered by the first primitive.

8. The method of claim 1, wherein the first primitive is a triangle.

9. A system comprising:
   a processor, and
   a memory coupled to the processor,
   wherein the processor is configured to perform a method of rendering graphics, the method comprising:
   invoking a pixel shader for the first pixel for the first primitive when one or more covered samples include at least one of one or more color samples, wherein the first pixel includes a plurality of samples, wherein the plurality of samples include the one or more color samples and a plurality of depth samples, wherein the plurality of samples of the first pixel includes the one or more covered samples that are covered by the first primitive; and
   not invoking the pixel shader for the first pixel for the first primitive when the one or more covered samples do not include at least one of the one or more color samples but do include at least one depth sample of the plurality of depth samples;
   deriving a color value, for the first primitive, for a display pixel not associated with a color sample but associated with a depth sample by assigning a color value of a color sample at a same depth value as the depth sample.

10. The system of claim 9,
    wherein the processor includes a central processing unit (CPU) and a graphics processing unit (GPU).

11. The system of claim 9, further comprising a display device,
    wherein the method further comprises presenting the graphics on the display device.

12. The system of claim 9, wherein the method further comprises:
    performing an early depth test for at least one of the covered samples to determine whether the covered samples are depth occluded.

13. The system of claim 9, wherein the one or more color samples of the first pixel is a plurality of color samples and a color sample count of the first pixel is less than a depth sample count of the first pixel.

14. A graphics processing unit (GPU) comprising:
    a memory module; and
    a rasterization module implemented in hardware and/or software configured to: invoke a pixel shader for the first pixel for the first primitive when one or more covered samples that are covered by the first primitive include at least one of one or more color samples, wherein the first pixel includes a plurality of samples, wherein the plurality of samples includes the one or more color samples and a plurality of depth samples, wherein the plurality of samples of the first pixel include as the one or more covered samples; and
    not invoke the pixel shader for the first pixel for the first primitive when the one or more covered samples do not include at least one of the one or more color samples but do include at least one depth sample of the plurality of depth samples;
    deriving a color value, for the first primitive, for a display pixel not associated with a color sample but associated with a depth sample by assigning a color value of a color sample at a same depth value as the depth sample.

15. The GPU of claim 14, wherein the rasterization module is implemented in hardware.

16. The GPU of claim 14, wherein the rasterization module is further configured to:
perform an early depth test for at least one of the covered samples to determine whether each of said at least one of the covered samples are depth occluded.

17. A non-transitory computer readable medium having processor-executable instructions embodied therein, wherein execution of the instructions by a processor causes the processor to implement a method of rendering graphics, the method comprising: invoking a pixel shader for the first pixel for the first primitive when one or more covered samples that are covered by the first primitive include at least one of one or more color samples, wherein the first pixel includes the one or more color samples and a plurality of depth samples, wherein the plurality of samples includes the one or more covered samples; and
not invoking the pixel shader for the first pixel for the first primitive if said determining determines that the one or more covered samples do not include at least one of the color samples;
deriving a color value, for the first primitive, for a display pixel not associated with a color sample but associated with a depth sample by assigning a color value of a color sample at a same depth value as the depth sample.

18. The non-transitory computer readable medium of claim 17, wherein the method further comprises:
before said determining whether the covered samples include at least one of the color samples, performing an early depth test for at least one of the covered samples to determine whether the covered samples are depth occluded, wherein it is determined in said performing the early depth test that the covered samples include one or more surviving covered samples that are not depth occluded;
wherein said determining whether the covered samples include at least one of the color samples of the first pixel comprises determining whether the surviving covered samples include at least one of the color samples of the first pixel.

* * * * *